(12) United States Patent
Futaki et al.

(10) Patent No.: US 11,838,801 B2
(45) Date of Patent: *Dec. 5, 2023

(54) RADIO ACCESS NETWORK NODE, AND METHOD AND NON-TRANSITORY COMPUTER READABLE MEDIUM THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,545

(22) Filed: Oct. 27, 2021

(65) Prior Publication Data
US 2022/0046480 A1 Feb. 10, 2022

Related U.S. Application Data

(63) Continuation of application No. 16/899,898, filed on Jun. 12, 2020, now Pat. No. 11,172,404, which is a
(Continued)

(30) Foreign Application Priority Data

Nov. 13, 2017 (JP) ................................. 2017-218041

(51) Int. Cl.
*H04W 28/20* (2009.01)
*H04W 76/27* (2018.01)
(Continued)

(52) U.S. Cl.
CPC ........... *H04W 28/20* (2013.01); *H04W 72/23* (2023.01); *H04W 76/10* (2018.02); *H04W 76/27* (2018.02); *H04W 80/02* (2013.01); *H04B 7/0413* (2013.01); *H04W 72/0453* (2013.01); *H04W 76/15* (2018.02); *H04W 92/20* (2013.01)

(58) Field of Classification Search
CPC .............................. H04W 76/11; H04W 20/28
See application file for complete search history.

(56) References Cited

U.S. PATENT DOCUMENTS

2018/0368205 A1* 12/2018 Park ........................ H04L 41/06
2019/0075023 A1* 3/2019 Sirotkin ................ H04W 88/08
(Continued)

FOREIGN PATENT DOCUMENTS

JP 2003-348007 A 12/2003

OTHER PUBLICATIONS

3GPP TSG RAN WG2 Meeting #99bis R2-1710592 Prague, Czech Republic, Oct. 9-13, 2017—Source: intel Corporation Title: Overall impact in RAN2 for BWP (8 pages) (Year: 2017).*
(Continued)

*Primary Examiner* — Sulaiman Nooristany
(74) *Attorney, Agent, or Firm* — Sughrue Mion, PLLC

(57) ABSTRACT

A radio access network (RAN) node (11) is configured to send, to another RAN node (12), first control information regarding at least one of one or more bandwidth parts (BWPs) configured in a system bandwidth. It is thus, for example, possible to contribute to inter-radio access network (RAN) node (e.g., inter-gNB) signaling enhanced to handle bandwidth parts.

10 Claims, 19 Drawing Sheets

Related U.S. Application Data continuation of application No. 16/277,416, filed on Feb. 15, 2019, now Pat. No. 10,721,653, which is a continuation of application No. PCT/JP2018/030312, filed on Aug. 14, 2018.

(51) Int. Cl.

| | | |
|---|---|---|
| *H04W 76/10* | (2018.01) | |
| *H04W 80/02* | (2009.01) | |
| *H04W 72/23* | (2023.01) | |
| H04W 72/0453 | (2023.01) | |
| H04B 7/0413 | (2017.01) | |
| H04W 76/15 | (2018.01) | |
| H04W 92/20 | (2009.01) | |

(56) References Cited

U.S. PATENT DOCUMENTS

| | | | |
|---|---|---|---|
| 2019/0253966 A1* | 8/2019 | Park | .................. H04W 8/24 |
| 2019/0380128 A1 | 12/2019 | Park et al. | |
| 2020/0383164 A1 | 12/2020 | Kim | |

OTHER PUBLICATIONS

3GPP R1-1711795, Ericsson, "On bandwidth parts and "RF" requirements", TSG RAN1 NR Ad-Hoc#2, 9 sheets, (Jun. 2017)
3GPP R2-1707624, "LS on Bandwidth Part Operation in NR", 3GPP TSG RAN WG2#99, 3 sheets, (Aug. 2017).
3GPP R2-1710012, "LS on Further agreements for Bandwidth part operation", 3GPP TSG RAN WG2 #99bis, 2 sheets, (Oct. 2017).
3GPP R2-1710031, "Reply LS on multiple SSBs within a wideband carrier", 3GPP TSG RAN WG2 #99bis, 1 sheet, (Oct. 2017).
3GPP R2-1711640, ZTE Corporation, Sane Chips, "Initial discussion on the impacts of BWP on RAN2", 3GPP TSG-RAN WG2 Meeting #99bis, 5 sheets, (Oct. 2017).
3GPP R2-1711969, Ericsson, "Text Proposal for L1 parameters for 38.331", 3GPP TSG-RAN WG2 #99bis, 27 sheets, (Oct. 2017).
3GPP R2-1709861, "LS on multiple SSBs within a wideband carrier", 3GPP TSG RAN WG2#99, 1 sheet, (Aug. 2017).
3GPP R1-1715648, "Remaining details for bandwidth part operation", TSG RAN WG1 NR AH#3, 3 sheets, (Sep. 2017).
3GPP R3-175026, Nokia, Nokia Shanghai Bell, "EN-DC ANR and RAN sharing related updates for X2 setup stage 3", 3GPP TSG-RAN WG3 Meeting #98 R3-175026, 13 sheets, (Nov. 2017).
Decision to Grant a Patent issued by the Japanese Patent Office in corresponding application No. JP 2019-538282, dated Sep. 3, 2019.
Intel Corporation, Overall impact in RAN2 for BWP, 3GPP TSG RAN WG2 #99bis R2-1710592, Sep. 29, 2017.
Samsung, UE context setup procedure, 3GPP TSG RAN WG3 #97 R3-172960, Aug. 12, 2017.
S2-102386, Samsung, "Fix LIPA open issues", 3GPP TSG SA WG2 Meeting #79, May 10-14, 2010, Kyoto, Japan.
Extended European Search Report dated Nov. 19, 2020, issued in counterpart European Patent Application No. 18877156.2-1216.
JP Office Action for JP Application No. 2022-110275, dated May 16, 2023 with English Translation.
Mediatek Inc., Basic Framework for Bandwidth Part Operation, 3GPP TSG RAN WG2 #99bis R2-1710864, Oct. 13, 2017.
LG Electronics Inc., RRC Procedures for BWP Configuration, 3GPP TSG RAN WG2 #99bis R2-1711388, Oct. 13, 2017.

* cited by examiner

Bandwidth Part (BWP) List

| IE / Groupe Name | Presence | Range | IE Type / Note |
|---|---|---|---|
| Bandwidth Part List | | 1 | |
| >Bandwidth Part Item IEs | | 1..<maxnoofBandwidthPart Items> | |
| >>BWP Index | M | | |
| >>SSB Presence | O | | For FDD-DL and TDD |
| >>SSB Position | O | | Time domain position of SSB RRC ssb-PositionINBurst |
| >>Location | M | INTEGER (...) | E.G. Frequency offset from PRB0 or cell defening SSB to lowest PRB of BWP |
| >>Bandwidth | M | INTEGER (...) | E.G. Number of PRBs or frequency bandwidth |
| >>Subcarrier spacing | M | ENUMERATED (15kHz, 30kHz, 60kHz, 120kHz, 240kHz, ...) | |

Fig. 14

RADIO ACCESS NETWORK NODE, AND METHOD AND NON-TRANSITORY COMPUTER READABLE MEDIUM THEREFOR

CROSS-REFERENCE TO RELATED PATENT APPLICATIONS

This application is a continuation of U.S. patent application Ser. No. 16/899,898, filed Jun. 12, 2020, which is a continuation of U.S. patent application Ser. No. 16/277,416, filed Feb. 15, 2019, now U.S. Pat. No. 10,721,653, issued on Jul. 21, 2020, which is a continuation of International Application No. PCT/JP2018/030312, filed Aug. 14, 2018, which claims priority from Japanese Patent Application No. 2017-218041, filed Nov. 13, 2017. The entire contents of the above-referenced applications are expressly incorporated herein by reference.

TECHNICAL FIELD

The present disclosure relates to a radio communication system and, in particular, to use of one or more bandwidth parts configured within one carrier bandwidth.

BACKGROUND ART

The 3rd Generation Partnership Project (3GPP) has been working on the standardization for the fifth generation mobile communication system (5G) to make 5G a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NO RAN). A new base station in the NG-RAN is referred to as a NR NodeB (NR NB) or a gNodeB (gNB). A new core network for the 5G System is referred to as a 5G Core Network (5G-CN or 5GC) or a NextGen Core (NG Core). A radio terminal (i.e., User Equipment (UE)) capable of being connected to the 5G System is referred to as 50 UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro. LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS.

In contrast, with regard to the 5G System, it is discussed that although radio bearers may be used in the NG RAN, no bearers are used in the 5GC or in the interface between the 5GC and the NG-RAN. Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. Association between a 5G UE and a data network is referred to as a "PDU session". The term "PDU session" corresponds to the term "PDN connection" in LTE and LTE-Advanced. A plurality of PDU flows can be configured in one PDU session. The 3GPP specifications define a 5G QoS Indicator (5QI) corresponding to the QCI of the LTE for the 5G system.

The PDU flow is also referred to as a "QoS flow". The QoS flow is the finest granularity in QoS treatment in the 5G system. User plane traffic having the same N3 marking value in a PDU session corresponds to a QoS flow. The N3 marking corresponds to the above-described PDU flow ID, and it is also referred to as a QoS flow Identity (QFI) or a Flow Identification Indicator (FII). There is one-to-one relationship (i.e., one-to-one mapping) at least between each 5QI defined in the specification and a corresponding QFI having the same value (or number) as this 5QI.

FIG. 1 shows a basic architecture of the 5G system. A UE establishes one or more Signalling Radio Bearers (SRBs) and one or more Data Radio Bearers (DRBs) with a gNB. The 5GC and the gNB establish a control plane interface and a user plane interface for the UE. The control plane interface between the 5GC and the gNB (i.e., RAN) is referred to as an N2 interface, an NG2 interface or an NG-c interface, and is used for transfer of Non-Access Stratum (NAS) information and for transfer of control information (e.g., N2 AP Information Element) between the 5GC and the gNB. The user plane interface between the 5GC and the gNB (i.e., RAN) is referred to as an N3 interface, an NG3 interface or an NG-u interface, and is used for transfer of packets of one or more PDU flows in a PDU session of the UE.

Note that, the architecture shown in FIG. 1 is merely one of the 5G architecture options (or deployment scenarios). The architecture shown in FIG. 1 is referred to as "Standalone NR (in NextGen System)" or "Option 2". The 3GPP further discusses network architectures for multi-connectivity operations using the E-UTRA and NR radio access technologies. A representative example of the multi-connectivity operations is Dual Connectivity (DC) in which one Master node (MN) and one Secondary node (SN) cooperate with each other and simultaneously communicate with one UE. The Dual Connectivity operation using the E-UTRA and NR radio access technologies is referred to as Multi-RAT Dual Connectivity (MR-DC). The MR-DC is dual connectivity between E-UTRA and NR nodes.

In the MR-DC, one of the E-UTRA node (i.e., eNB) and the NR node (i.e., gNB) operates as a Master node (MN), while the other one operates as a Secondary node (SN), and at least the MN is connected to the core network. The MN provides one or more Master Cell Group (MCG) cells to the UE, while the SN provides one or more Secondary Cell Group (SCG) cells to the UE. The MR-DC includes "MR-DC with the EPC" and "MR-DC with the 5GC".

The MR-DC with the EPC includes E-UTRA-NR Dual Connectivity (EN-DC). In the EN-DC, the UE is connected to an eNB operating as the MN and a gNB operating as the SN. Further, the eNB (i.e., Master eNB) is connected to the EPC, while the gNB (i.e. Secondary gNB) is connected to the Master eNB through the X2 interface.

The MR-DC with the 5GC includes NR-E-UTRA Dual Connectivity (NE-DC) and NG-RAN E-UTRA-NR Dual Connectivity (NG-EN-DC). In the NE-DC, the UE is connected to a gNB operating as the MN and an eNB operating as the SN, the gNB (i.e., Master gNB) is connected to the 5GC, and the eNB (i.e. Secondary eNB) is connected to the Master gNB through the Xn interface. On the other hand, in the NO-EN-DC, the UE is connected to an eNB operating as the MN and a gNB operating as the SN, and the eNB (i.e., Master eNB) is connected to the 5GC, and the gNB (i.e. Secondary gNB) is connected to the Master eNB through the Xn interface.

FIGS. 2, 3 and 4 show the network configurations of the above-described three DC types: EN-DC, NE-DC and NG-EN-DC, respectively. Note that, although the Secondary gNB (SgNB) in the EN-DC of FIG. 2 is also referred to as en-gNB, and the Secondary eNB (SeNB) in the NE-DC of FIG. 3 and the Master eNB (MeNB) in the NG-EN-DC of FIG. 4 are also referred to as ng-eNB, they are simply referred to as gNB or eNB in this specification. The 5G System further supports dual connectivity between two gNBs. In this specification, dual connectivity between two gNBs is referred to as NR-NR DC. FIG. 5 shows the network configuration of NR-NR DC.

The NR is expected to use different sets of radio parameters in multiple frequency bands. Each radio parameter set is referred to as "numerology". OFDM numerology for an Orthogonal Frequency Division Multiplexing (OFDM) system includes, for example, subcarrier spacing, system bandwidth. Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on service requirements.

The UE and the NR gNB in the 5G system support aggregation of multiple NR carriers with different numerologies. The 3GPP discusses achievement of aggregation of multiple NR carriers (or NR cells) with different numerologies by lower layer aggregation, such as the existing LTE Carrier Aggregation (CA), or higher layer aggregation, such as the existing Dual Connectivity.

The 5G NR supports channel bandwidths wider than those of the LTE (e.g., 100 s of MHz). One channel bandwidth (i.e., a $BW_{Channel}$) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 500 MHz.

In order to effectively support multiple 5G services, such as wideband services like eMBB and narrow-bandwidth services like Internet of Things (IoT), it is preferable to multiplex these services onto a single channel bandwidth. Further, if every 5G UE needs to support transmission and reception in a transmission bandwidth corresponding to the entire channel bandwidth, this may hinder achievement of lower cost and lower power consumption of UEs for narrow-bandwidth IoT services. Thus, the 3GPP allows one or more bandwidth parts (BWPs) to be configured in the carrier bandwidth (i.e., channel bandwidth or system bandwidth) of each NR component carrier. Multiple BWPs in one NR channel bandwidth may be used for different frequency division multiplexing (FDM) schemes using different numerologies (e.g., subcarrier spacing (SCS)). The bandwidth part is also referred to as carrier bandwidth part.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not include a SS/PBCH block (SSB). A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SSB to be accessed by a UE is configured by higher layer signaling. The reference point "PRB 0" is common to all the UEs that share the same wideband component carrier.

One SS/PBCH block includes primary signals necessary for an idle UE, such as NR synchronization signals (NR-SS) and an NR physical broadcast channel (NR-PBCH). The NR-SS is used by the UE for DL synchronization. A Reference Signal (RS) is transmitted in the SS/PBCH block to enable an idle UE to perform Radio Resource Management (RRM) measurement (e.g., RSRP measurement). This RS may be the NR-SS itself or may be an additional RS. The NR-PBCH broadcasts part of the minimum System Information (SI), for example a Master Information Block (MIB). The remaining minimum SI (RMSI) is transmitted on a Physical Downlink Shared Channel (PDSCH).

A network can transmit multiple SS/PBCH blocks within the channel bandwidth of one wideband component carrier. In other words, SS/PBCH blocks may be transmitted in a plurality of BWPs within the channel bandwidth. In a first scheme, all the SS/PBCH blocks within one broadband carrier are based on NR-SS (e.g., a primary SS (PSS) and a secondary SS (SSS)) corresponding to the same physical-layer cell identity. In a second scheme, different SS/PBCH blocks within one broadband carrier may be based on NR-SS corresponding to different physical-layer cell identities.

From a UE perspective, a cell is associated with one SS/PBCH block. Therefore, for UEs, each serving cell has a single associated SS/PBCH block in frequency domain. Note that, each serving cell is a primary cell (PCell) in carrier aggregation (CA) and dual connectivity (DC), a primary secondary cell (PSCell) in DC, or a secondary cell (SCell) in CA and DC. Such an SSB is referred to as a cell defining SS/PBCH block. The Cell defining SS/PBCH block has an associated RMSI. The Cell defining SS/PBCH block is used as the time reference or the timing reference of the serving cell. Further, the Cell defining SS/PBCH block is used for SS/PBCH block (SSB) based RRM Measurements. The Cell defining SS/PBCH block can be changed for the PCell/PSCell by "synchronous reconfiguration" (e.g., reconfiguration of radio resource configuration information using an RRC Reconfiguration procedure and not involving a handover), while it can be changed for SCells by "SCell release/add".

One or more BWP configurations for each component carrier are semi-statically signaled to the UE. To be specific, for each UE-specific serving cell, one or more DL BWPs and one or more UL BWPs can be configured for the UE via a dedicated RRC message. Further, each of the one or more BWPs configured for the UE can be activated and deactivated. Activation/deactivation of a BWP is determined not by an RRC layer but by a lower layer (e.g., Medium Access Control (MAC) layer or Physical (PHY) layer). The activated BWP is referred to as active BWP.

Switching of the active BWP may be performed, for example, by Downlink Control Information (DCI) (e.g., scheduling DCI) transmitted on a NR Physical Downlink Control Channel (PDCCH). In other words, deactivation of the current active BWP and activation of a new active BWP may be performed by the DCI in the NR PDCCH. Thus, the network can activate/deactivate a BWP depending, for example, on a data rate, or on numerology required by a service, and can thereby dynamically switch the active BWP for the UE. Activation/deactivation of the BWP may be performed by a MAC Control Element (CE).

FIGS. 6 and 7 show usage examples of BWPs. In the example shown in FIG. 6, the channel bandwidth of one component carrier is divided into BWP #1 and BWP #2, and these two BWPs are used for FDM schemes using different numerologies (e.g., different subcarrier spacing). In the example shown in FIG. 7, narrowband BWP #1 is set in a channel bandwidth of one component carrier and narrowband BWP #2 narrower than BWP #1 is further set within the BWP #1. When BWP #1 or BWP #2 is activated for the UE, this UE can reduce its power consumption by refraining from performing reception and transmission within the channel bandwidth except the active BWP.

Non Patent Literatures 1 to 7 disclose the above-described BWP and cell defining SS/PBCH block.

CITATION LIST

Non Patent Literature

Non Patent Literature 1: 3GPP R1-1711795, Ericsson, "On bandwidth parts and "RF" requirements", TSG RAN1 NR Ad-Hoc #2, Qingdao, P. R. China, June 2017
Non Patent Literature 2: 3GPP R2-1707624, "LS on Bandwidth Part Operation in NR", 3GPP TSG RAN WG2 #99, Berlin, Germany, August 2017
Non Patent Literature 3: 3GPP R2-1710012, "LS on Further agreements for Bandwidth part operation", 3GPP TSG RAN WG2 #99bis, Prague, Czech Republic, October 2017
Non Patent Literature 4: 3GPP R2-1710031, "Reply LS on multiple SSBs within a wideband carrier", 3GPP TSG RAN WG2 #99bis, Prague, Czech Republic, October 2017
Non Patent Literature 5:3GPP R2-1711640, ZTE Corporation, Sane Chips, "Initial discussion on the impacts of BWP on RAN2", 3GPP TSG-RAN WG2 Meeting #99bis, Prague, Czech Republic, October 2017
Non Patent Literature 6: 3GPP R2-1711969, Ericsson, "Text Proposal for L1 parametrs for 38.331", 3GPP TSG-RAN WG2 #99bis, Prague, Czech Republic, October 2017
Non Patent Literature 7: 3GPP R2-1709861, "LS on multiple SSBs within a wideband carrier", 3GPP TSG RAN WG2 #99, Berlin, Germany, August 2017

SUMMARY OF INVENTION

Technical Problem

It is unclear how each of RAN nodes (e.g., gNBs) placed in a radio access network knows BWP configurations of the others. One of objects to be achieved by embodiments disclosed herein is to provide an apparatus, a method, and a program that contribute to inter-RAN node (e.g., inter-gNB) signaling enhanced to handle bandwidth parts. It should be noted that this object is merely one of the objects to be attained by the embodiments disclosed herein. Other objects or problems and novel features will be made apparent from the following description and the accompanying drawings.

Solution to Problem

In a first aspect, a radio access network (RAN) node apparatus includes a memory and at least one processor coupled to the memory. The at least one processor is configured to send, to another RAN node, first control information regarding at least one of one or more bandwidth parts (BWPs) configured in a system bandwidth.

In a second aspect, a method for a radio access network (RAN) node apparatus includes sending, to another RAN node, first control information regarding at least one of one or more bandwidth parts (BWPs) configured in a system bandwidth.

In a third aspect, a program includes instructions (software codes) that, when loaded into a computer, cause the computer to perform the method according to the above-described second aspect.

Advantageous Effects of Invention

According to the above-deceived aspects, it is possible to provide an apparatus, a method, and a program that contribute to inter-RAN node (e.g., inter-gNB) signaling enhanced to handle bandwidth parts.

BRIEF DESCRIPTION OF DRAWINGS

FIG. 14 is a diagram showing an example of a format of "BWP list" Information Element (IE);

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

Figure 1:
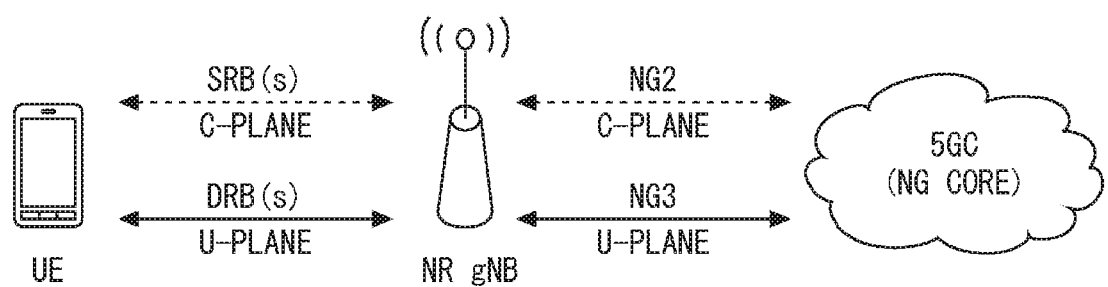
FIG. 1 is a diagram showing a basic architecture of a 5G System.
Figure 2:
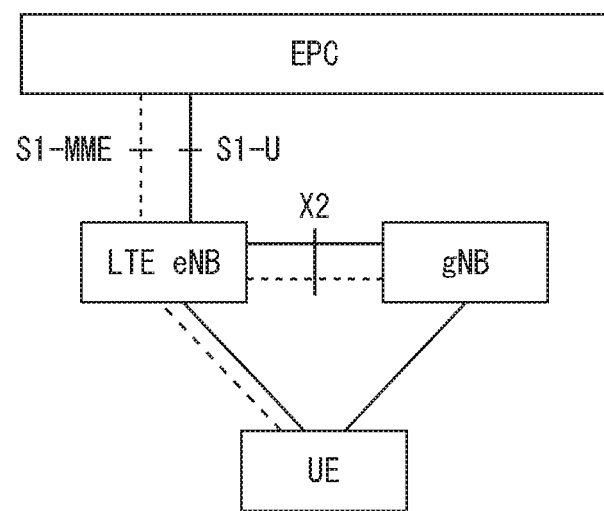
FIG. 2 is a diagram showing a network configuration of EN-DC.
Figure 3:
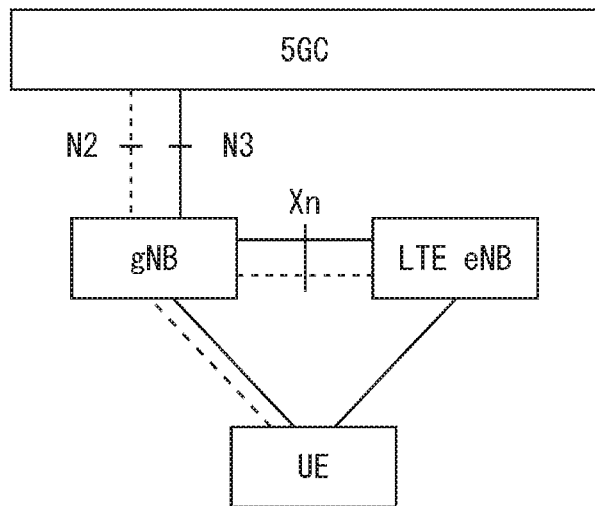
FIG. 3 is a diagram showing a network configuration of NE-DC.
Figure 4:
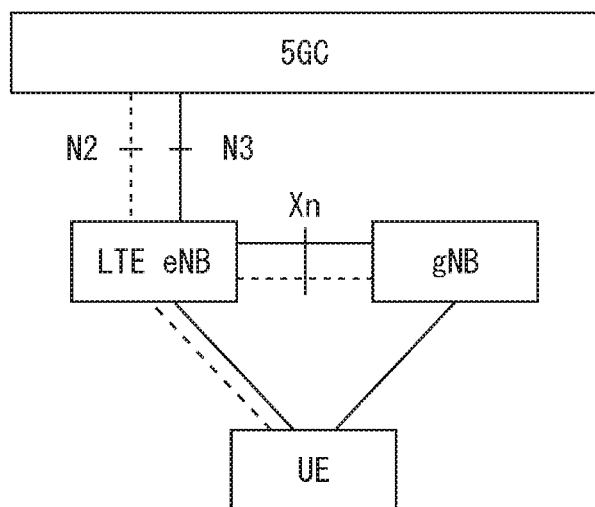
FIG. 4 is a diagram showing a network configuration of NG-EN-DC.
Figure 5:
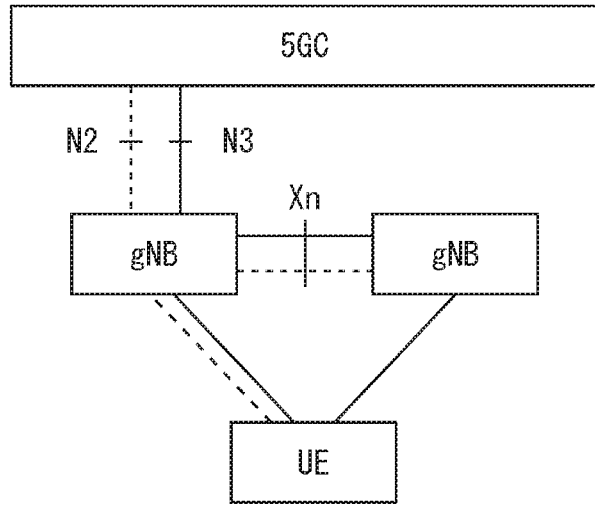
FIG. 5 is a diagram showing a network configuration of NR-NR DC.
Figure 6:
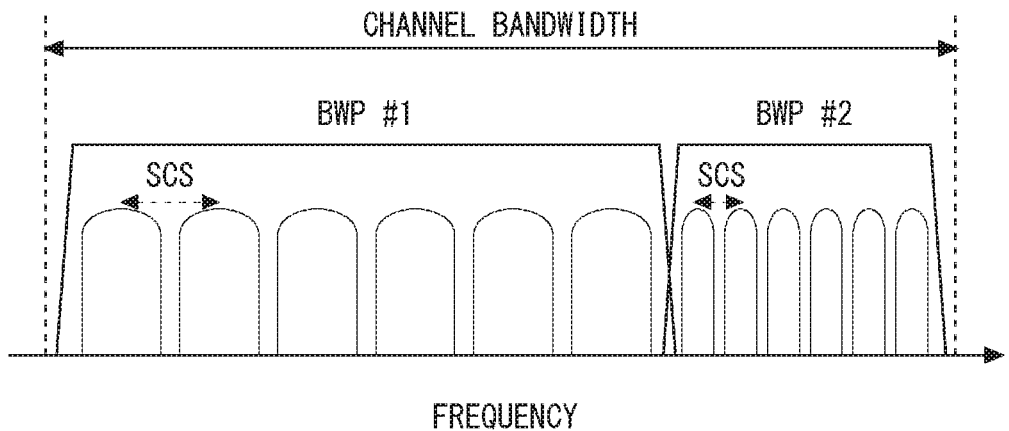
FIG. 6 is a diagram showing an example of use of Bandwidth parts (BWPs)
Figure 7:
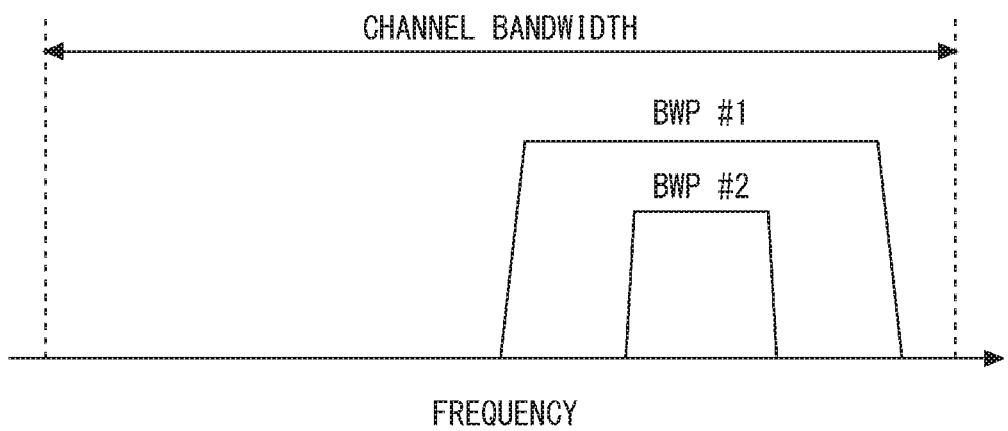
FIG. 7 is a diagram showing an example of use of Bandwidth parts (BWPs)
Figure 8:
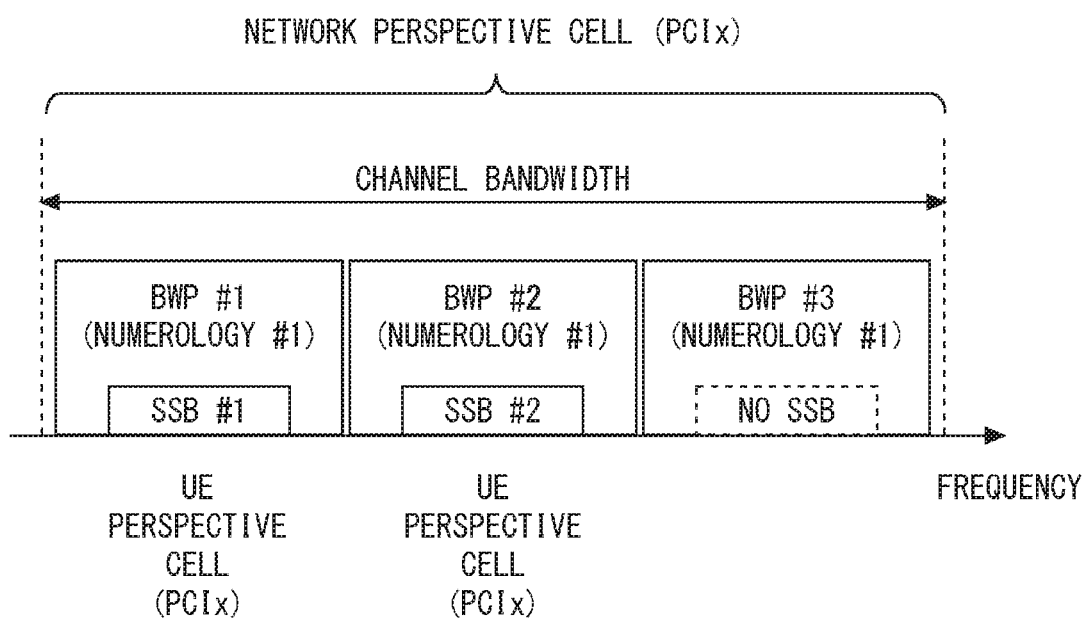
FIG. 8 is a diagram showing a configuration example of BWPs and SS/PBCH blocks.
Figure 9:
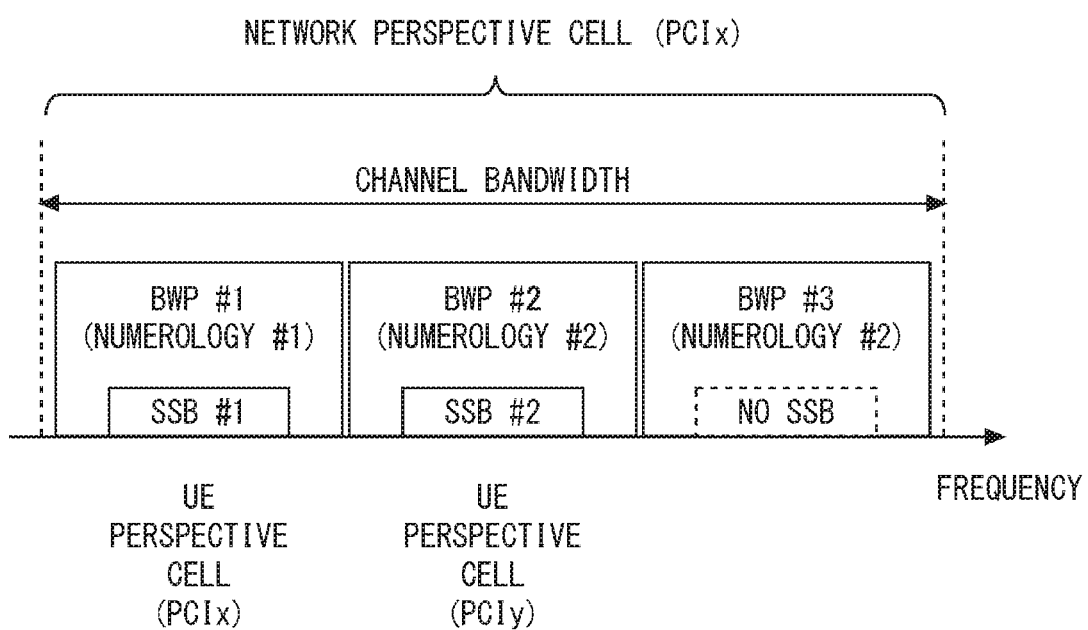
FIG. 9 is a diagram showing a configuration example of BWPs and SS/PBCH blocks.

First, the definition of terms used in cases where one system bandwidth includes multiple BWPs is described with reference to FIGS. 8 and 9. FIGS. 8 and 9 show configuration examples of BWPs and SS/PBCH blocks. In the examples shown in FIGS. 8 and 9, one channel bandwidth includes three BWPs: BWP #1, BWP #2 and BWP #3. BWP #1 and BWP #2 include SS/PBCH block (SSB) #1 and SSB #2, respectively, while BWP #3 does not include any SS/PBCH blocks.

From a network perspective, the entire bandwidth (i.e., channel bandwidth or system bandwidth) of one component carrier corresponds to one cell, just like in the existing LTE. In the examples of FIGS. 8 and 9, Physical Cell Identity (PCI) associated with a cell corresponding to the channel bandwidth is "PCIx".

In this specification, a cell from the network perspective is defined as a "logical cell." Further, a PCI associated with the cell from the network perspective (i.e., logical cell) is defined as a reference PCI. Note that, the cell from the network perspective (i.e., logical cell) may be associated with one Cell Identity. In this case, the Cell Identity of the cell from the network perspective (i.e., logical cell) may be associated with (sub-)PCIs of a plurality of physical cells, which are described later.

On the other hand, as described earlier, from a UE perspective, a cell is associated with one SS/PBCH block. In this specification, a cell from the UE perspective is defined as a "physical cell." Further, a PCI associated with the cell from the UE perspective (i.e., physical cell) is defined as a sub-PCI. Specifically, multiple BWPs that are included in the same system bandwidth and include their respective SS/PBCH blocks are multiple cells from the UE perspective (i.e., multiple physical cells). Sub-PCIs of these cells from the UE perspective (i.e., physical cells) are associated with one reference PCI or one Cell Identity of the cell from the network perspective (i.e., logical cell). Further, a BWP not including any SS/PBCH blocks may be defined as a cell from the UE perspective (i.e., physical cell), or a group of BWPs including a BWP without SS/PBCH block and a BWP with SS/PBCH block, which is referred to by the former one, may be defined as a cell from the UE perspective (i.e., physical cell). Note that, also in the network perspective, a unit system bandwidth that is actually used by the network (e.g., RAN node) for communication with the UE is each cell from the UE perspective (i.e., physical cell).

In the example of FIG. 8, the three BWPs support the same numerology (i.e., numerology #1), and all the SS/PBCH blocks (i.e., SSB #1 and SSB #2) within the channel bandwidth are based on NR-SS corresponding to the same (sub-)PCI (i.e., PCIx). Thus, FIG. 8 corresponds to the first scheme, which is described above in relation to transmission of multiple SS/PBCH blocks in one channel bandwidth. To synchronize with BWP #3 not including any SSBs, the UE monitors one of SSB #1 and SSB #2 transmitted in other BWPs. SSB #1 or SSB #2 to be monitored is referred to as a reference SSB, and the UE may receive a notification of the identifier of the reference SSB (SSB index. e.g., SSB #1 or #2) from the network.

In the example of FIG. 9, BWP #1 supports numerology #1, while BWP #2 and BWP #3 support numerology #2. Different SSBs #1 and #2 with different numerologies are based on NR-SSs corresponding to different (sub-)PCIs (i.e., PCIx and PCIy). Thus, FIG. 9 corresponds to the second scheme, which is described above in relation to transmission of multiple SS/PBCH blocks in one channel bandwidth. To synchronize with BWP #3 not including any SSBs, the UE monitors, for example, SSB #2 of BWP #2 that supports the same numerology as BWP #3. Alternatively, to synchronize with BWP #3 not including any SSBs, the UE may monitor SSB #1 of BWP #1 that supports numerology different from that of BWP #3.

In the example of FIG. 8, sub-PCIs (i.e., PCIx and PCIx) of two cells from the UE perspective (i.e., physical cells) are associated with the reference PCI (i.e., PCIx) or Cell Identity of one cell from the network perspective (i.e., logical cell). Meanwhile, in the example of FIG. 9, sub-PCIs (i.e., PCIx and PCIy) of two cells from the UE perspective (i.e., physical cells) are associated with the reference PCI (i.e., PCIx) or Cell Identity of one cell from the network perspective (i.e., logical cell).

The network (e.g., RAN node) may configure the UE with a BWP set including one or more BWPs. In other words, the UE receives, from the network, configuration information of one or more BWPs (e.g., SSB indexes, presence of SSBs, reference SSB indexes, Layer-1 parameters). The BWP set may be configured individually for each of downlink (DL) and uplink (UL). Thus, the BWP set may include a DL BWP set for DL and an UL BWP set for UL. Alternatively, an UL BWP and a DL BWP may be associated in advance with each other, and in this case the BWP set may be common to DL and UL. The UE can activate k (k<=K) BWPs among K BWPs included in the (DL/UL) BWP set. Stated differently, for certain UE, up to K (DL/UL) BWP(s) can be activated at a time. In the following description, it is assumed for the sake of simplification that one BWP (i.e. k=1) is activated. Note that, however, this embodiment and the subsequent embodiments are applicable also to the cases where two or more (k>=2) BWPs are activated at a time.

Further, in this specification, the term "BWP group" is employed. A BWP group is contained in a BWP set. One BWP group consists of one or more BWPs among which the active BWP can be changed by DCI transmitted on a NR PDCCH. Among one or more BWPs included in the same BWP group, the active BWP can be changed without change of the Cell defining SSB. Thus, the BWP group may be defined as one or more BWPs associated with the same cell defining SSB. One BWP group may include one BWP including the cell defining SSB (e.g., base BWP, initial BWP, or default BWP) and one or more other BWPs. Each of one or more other BWPs, which are not the base BWP (or initial BWP, default BWP), may or may not include a SSB. The UE may be explicitly informed (or may be configured as to) which SSB is the cell defining SSB. Alternatively, the UE may implicitly consider that the cell defining SSB is the SSB of the initial BWP when the UE has been configured with the BWP group.

The BWP group may be configured individually for each of downlink (DL) and uplink (UL). Thus, the BWP group may include a DL BWP group for DL and an UL BWP group for UL. Alternatively, an UL BWP and a DL BWP may be associated in advance with each other, and the BWP group in this case may be common to DL and UL.

In the example of FIG. 8, the UE is configured with one BWP set including BWP #1 to #3. In the example of FIG. 8, the UE may monitor SSB #1 transmitted in BWP #1 to synchronize with BWP #3 (i.e., to achieve synchronization in BWP #3). In this case, BWP #1 and BWP #3 may correspond to one BWP group, while BWP #2 may correspond to another one BWP group. Thus, one BWP set (BWPs #1, #2, and #3) may include a first BWP group (BWPs #1 and #3) and a second BWP group (BWP #2). Alternatively, one BWP set (BWPs #1, #2, and #3) may include a first BWP group (BWP #1) and a second BWP group (BWPs #2 and #3). Further alternatively, one BWP set (BWPs #1, #2, and #3) may correspond to one BWP group (BWPs #1, #2, and #3). In this case, one of SSB #1 and SSB #2 serves as the cell defining SSB for the UE.

In the example of FIG. 9 also, the UE is configured with one BWP set including BWP #1 to #3. In one example, BWP #1 with numerology #1 may correspond to one BWP group, while BWP #2 and BWP #3 with numerology #2 may correspond to another one BWP group. Thus, one BWP set (BWPs #1, #2, and #3) may include a first BWP group (BWP #1) and a second BWP group (BWPs #2 and #3). Note that, as described earlier, BWPs with different numerologies may be included in one BWP group. Thus, in another example, one BWP set (BWPs #1, #2, and #3) may include a first BWP group (BWPs #1 and #3) and a second BWP group (BWP #2). Further alternatively, one BWP set (BWPs #1, #2, and #3) may correspond to one BWP group (BWPs #1, #2, and #3). In this case, one of SSB #1 and SSB #2 serves as the cell defining SSB for the UE.

As described earlier, activation/deactivation of a BWP may be performed by a lower layer (e.g., Medium Access Control (MAC) layer, or Physical (PHY) layer), rather than by the RRC layer. A timer (e.g., BWP Inactivity Timer in the MAC layer) may be used for activation/deactivation of a DL BWP. The UE may switch the active BWP according to a timer based on a set value provided by the gNB. This timer may represent a period or duration in the unit of subframes. For example, when the UE transmit or receive no data for a predetermined period (i.e., expiration of the timer value) in the active BWP, it switches the active BWP to a predetermined BWP (e.g., default BWP, or BWP including the cell defining SSB). Such determination of the change of the active BWP based on the timer may be made also in the network (e.g., RAN node).

First Embodiment

Figure 10:
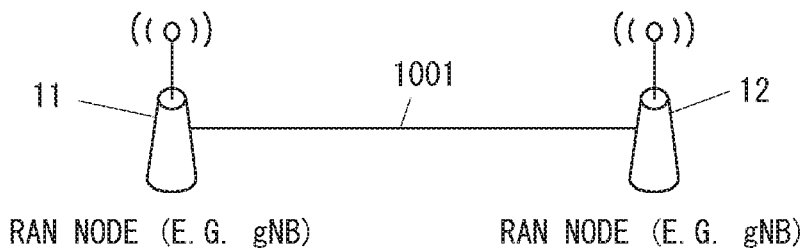
FIG. 10 is a diagram showing a configuration example of a radio communication network according to a first embodiment.

FIG. 10 shows a configuration example of a radio communication network according to this embodiment. In the example of FIG. 10, the radio communication network includes RAN nodes 11 and 12. The RAN nodes 11 and 12 are connected to each other through an interface 1001. The RAN node 11 is, for example, a gNB, or an eNB in MR-DC. Likewise, the RAN node 12 is, for example, a gNB, or an eNB in MR-DC. In this case, the interface 1001 is an Xn interface or an (enhanced) X2 interface.

One of the RAN nodes 11 and 12 may be a Central Unit (CU) (e.g., gNB-CU) in the cloud RAN (C-RAN) deployment, while the other one may be a Distributed Unit (DU) (e.g., gNB-DU). The Central Unit (CU) is also referred to as a Baseband Unit (BBU) or a digital unit (DU). The Distributed Unit (DU) is also referred to as a Radio Unit (RU), a Remote Radio Head (RRH), a Remote Radio Equipment (RRE), or a Transmission and Reception Point (TRP or TRxP). In this case, the interface 1001 is an interface (e.g., F1 interface) between the CU and the DU.

Figure 11:
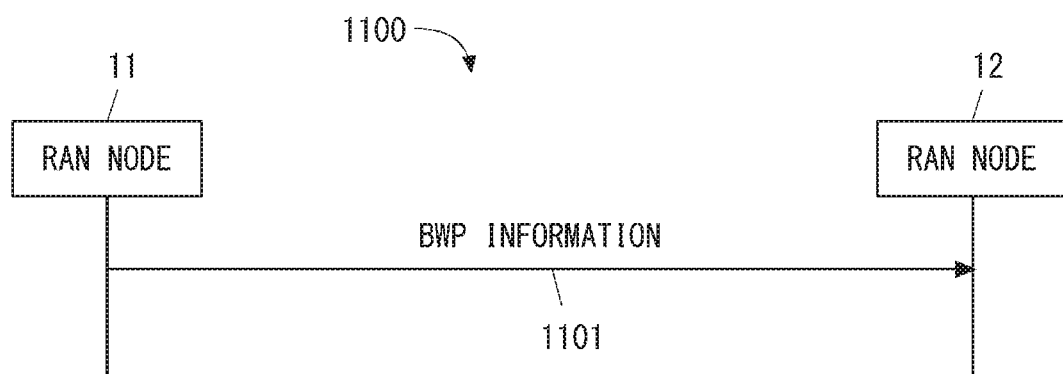
FIG. 11 is a sequence diagram showing an example of inter-node signaling according to the first embodiment.

FIG. 11 shows a process 1100 that is an example of inter-RAN node signaling. In Step 1101, the RAN node 11 sends, to the RAN node 12, control information regarding at least one of one or more BWPs configured in one component carrier bandwidth (i.e., channel bandwidth or system bandwidth). This control information is hereinafter referred to as BWP-related control information. Likewise, the RAN node 12 may send BWP-related control information to the RAN node 11.

In some implementations, the RAN node 11 may send the BWP-related control information to notify the RAN node 12 of the details of one or more BWPs configured in a component carrier associated with a cell operated by the RAN node 11. In addition, or alternatively, in some implementations, the RAN node 11 (e.g., a CU in the C-RAN deployment) may send the BWP-related control information to indicate, to the RAN node 12 (e.g., a DU in the C-RAN deployment), the details of one or more BWPs to be configured in the RAN node 12.

In addition, or alternatively, in some implementations, the RAN node 12 (e.g., a DU in the C-RAN deployment) may send the BWP-related control information to notify the RAN node 11 (e.g., a CU in the C-RAN deployment) of the details of one or more BWPs (i.e., one or more physical cells) to be configured, or available to be configured, in a component carrier associated with a cell (i.e., logical cell) operated by the RAN node 12. In addition, or alternatively, in some implementations, the RAN node 12 (e.g., a DU in the C-RAN deployment) may send, to the RAN node 11 (e.g., a CU in the C-RAN deployment), the BWP-related control information containing information regarding the configuration status of one or more BWPs for a UE camping on a (logical) cell operated by the RAN node 12 (e.g., UE-specific BWP configuration status information).

For example, the RAN node 11 may send the above-described control information to the RAN node 12 during a setup procedure of the interface 1001. The RAN node 11 may send the above-described BWP-related control information to the RAN node 12 during a modification procedure of the interface 1001.

Accordingly, the RAN nodes 11 and 12 can contribute to inter-RAN node (e.g., inter-gNB) signaling enhanced to handle BWPs. Each of the RAN nodes 11 and 12, i.e., a plurality of RAN nodes (e.g., gNBs), can thus know the BWP configuration of the other.

The RAN node 12 may use at least part of the BWP-related control information received from the RAN node 11 for UE handover, interference avoidance or mitigation between neighbor cells, or determination of SCell (i.e., Secondary Cell Group (SCG) SCell) or SN for DC. For example, the RAN node 12 may determine, on the basis of the BWP-related control information received from the RAN node 11, a BWP of the neighbor cell to be measured by a UE. The RAN node 12 may determine, on the basis of the BWP-related control information received from the RAN node 11, a BWP of the neighbor cell to which a UE should be handed over (i.e., a target BWP). The RAN node 12 may determine, on the basis of the BWP-related control information received from the RAN node 11, a BWP to be used as an SCG SCell for a UE.

In addition, or alternatively, the RAN node 11 may use at least part of the transmitted BWP-related control information sent to the RAN node 12 for UE handover, interference avoidance or mitigation between neighbor cells, or determination of SCell (i.e., Secondary Cell Group (SCG) SCell) or SN for DC.

In order to enable such BWP-related radio resource control, the BWP-related control information may contain at least one of the following information elements (IEs):

Information element indicating one or more BWP indices associated with one or more downlink BWPs;
Information element indicating one or more BWP indices associated with one or more uplink BWPs;
Information element indicating a carrier frequency (e.g., Absolute Radio Frequency Channel Number (ARFCN)) associated with each BWP;
Information element indicating whether each BWP contains an SS/PBCH block (SSB);
Information element indicating a reference SSB associated with a BWP not containing any SSBs, or indicating a reference BWP that contains this SSB;
Information element indicating the construction of an SSB to be transmitted on each BWP (e.g., SS sequence or PCI. SSB duration, numerology);
Information element indicating an offset from a reference RPB (e.g., PRB0) to the lowest PRB of each SSB;
Information element indicating a numerology with which the each BWP is configured; and
Information element indicating the construction of a BWP set or a BWP group (e.g., information about the index of each BWP group and a list of BWP indices contained therein).

These information elements (IEs) may relate to BWPs to be configured in a component carrier (or logical cell) operated by the RAN node 12. In addition, or alternatively, these information elements (IEs) may relate to BWPs configured in a component carrier (or logical cell) operated by the RAN node 11.

The BWP-related control information may contain an information element (e.g., PRACH Configuration IE) regarding radio resources (e.g., time and frequency resource information, preamble index) in one or more of UL BWPs available for random access preamble transmission. In addition, or alternatively, the BWP-related control information may contain an information element indicating an uplink BWP, among one or more UL BWPs, to be used by a UE to perform random access preamble transmission. The RAN node 12 uses the BWP-related control information received from the RAN node 11, thereby, for example, avoiding or mitigating interference between neighbor cells in random access preamble transmission.

The BWP-related control information may contain one or both of: an information element indicating availability of network slicing in each BWP; and an information element indicating quality of service (QoS) applied to each BWP. Alternatively, the BWP-related control information may be associated with one or both of: an information element indicating availability of network slicing in each BWP; and an information element indicating quality of service (QoS) supported by (or applied to) each BWP. The BWP-related control information may indicate those information elements on a per-BWP set or per-BWP group basis, instead of a per-BWP basis.

For example, different network slices are provided by (or associated with) one or more BWPs within a component carrier associated with a (logical) cell operated by the RAN node 11. In this case, the RAN node 11 sends information about those network slices to the RAN node 12. For example, each network slice may be specified with a slice type (e.g., Slice Service Type: SST). The SST may be specified with a service type (e.g., eMBB, URLLC, mMTC), or with an identifier of a core network node to which the RAN node is connected to. The core network node is, for example, an Access and Mobility Management Function (AMF), a Session Management Function (SMF), or a User Plane Function (UPF). For example, the RAN node 12 can thereby determine a BWP on which a UE is to camp on or a BWP to which a UE is to be handed over, while considering which network slicing is available or provided in each BWP of the RAN node 11. Consequently, the UE can execute a desired service or obtain expected performance (e.g., throughput, transmission rate).

When different SS/PBCH blocks in one wideband carrier are based on different NR-SSs corresponding to different PCIs (e.g., the second scheme as shown in FIG. 9), the BWP-related control information may further contain an information element indicating a relationship between one reference PCI (or one Cell Identity) associated with a cell from the network perspective (i.e., logical cell) corresponding to the system bandwidth and a sub-PCI associated with each BWP. Referring to the example of FIG. 9, the BWP-related control information may indicate that BWP #1 containing SSB #1 based on the sub-PCI "PCIx" and BWP #2 containing SSB #2 based on the sub-PCI "PCIy" are configured in a cell from the network perspective for which the reference PCI "PCIx" is configured (i.e., the entire component carrier). Thus, even when one-to-one mapping between Cell Identity and PCI is not achieved and therefore one-to-one mapping between Cell Global Identity (CGI) and PCI is not achieved in a public land mobile network (PLMN), management and control of physical cells for UEs can be done appropriately. The CGI consists of, for example, a PLMN Id and a Cell Identity (PLMN Id+Cell Identity). The management and control of physical cell for UEs include, for example, managing or controlling which physical cell a UE stays in, which physical cell a UE is configured with, or which physical cell a UE is to be moved to.

Second Embodiment

Figure 12:
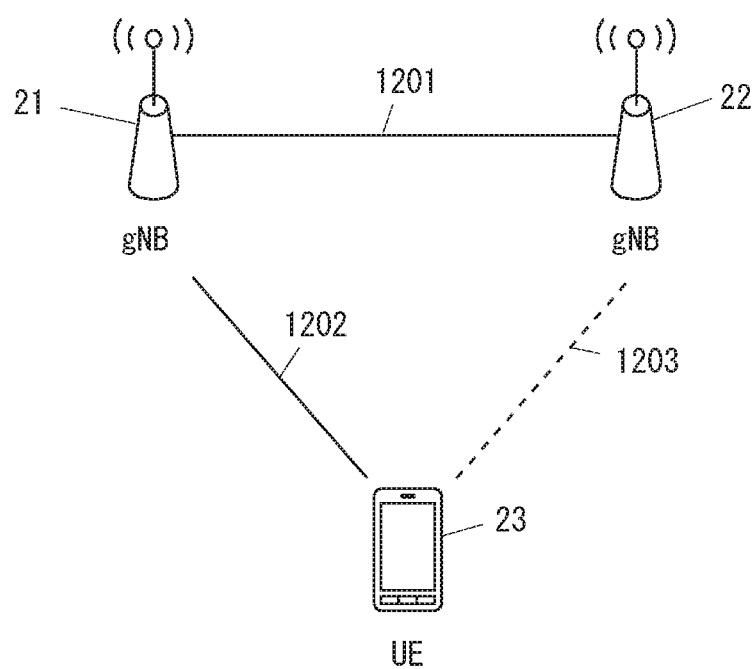
FIG. 12 is a diagram showing a configuration example of a radio communication network according to a second embodiment.

This embodiment provides specific examples of the BWP-related control information described in the first embodiment. FIG. 12 shows a configuration example of a radio communication network according to this embodiment. In the example of FIG. 12, the radio communication network includes a gNB 21, a gNB 22, and a UE 23. The gNBs 21 and 22 are connected to each other through an interface 1201. The interface 1201 is an Xn interface. The UE 23 is connected to the gNB 21, or the gNB 22, or both, through an air interface 1202, or 1203, or both.

Figure 13:
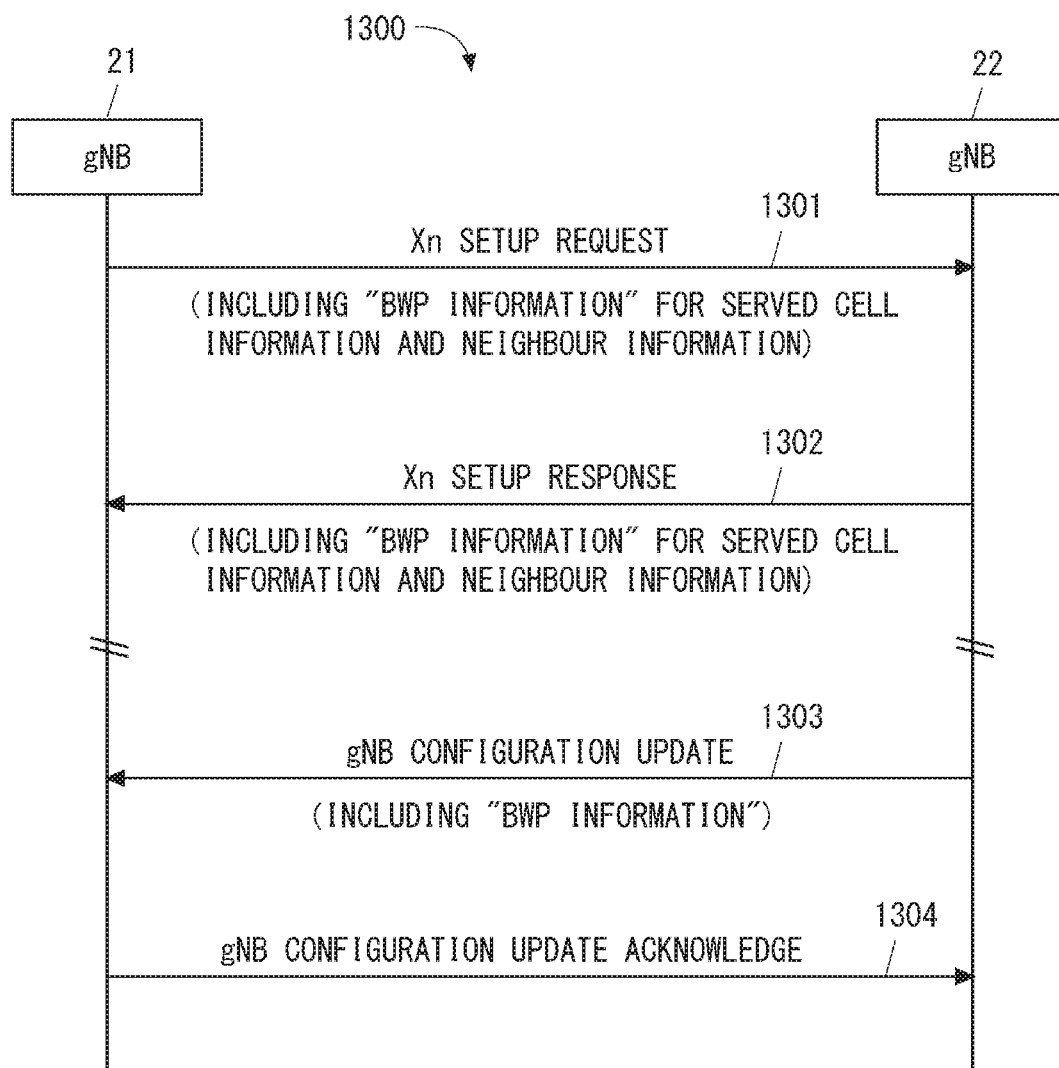
FIG. 13 is a sequence diagram showing an example of signaling regarding BWP configuration according to the second embodiment.

FIG. 13 shows a process 1300 that is an example of inter-RAN node signaling. In Step 1301, the gNB 21 sends, to the gNB 22, BWP-related control information via an Xn SETUP REQUEST message. In Step 1302, the gNB 22 sends, to the gNB 21, BWP-related control information via an Xn SETUP RESPONSE message. When the BWP-related control information is updated, the gNB 22 may send, to the gNB 21, the updated BWP-related control information via a gNB CONFIGURATION UPDATE message (Step 1303). In response to receiving the gNB CONFIGURATION UPDATE message, the gNB 21 sends, to the gNB 22, a gNB CONFIGURATION UPDATE ACKNOWLEDGE message.

The BWP-related control information may be contained in a Served Cell information IE and a Neighbour Information IE within an Xn message (e.g., Xn SETUP REQUEST/RESPONSE messages (Step 1301/1302)). To be specific, the Served Cell information IE may contain an FDD Info IE or a TDD Info IE, and the FDD Info IE may contain an UL BWP List IE and a DL BWP List IE, while the TDD Info IE may contain a BWP List IE.

In addition, or alternatively, the Served Cell information IE may contain a RACH Configuration IE, and the RACH Configuration IE may indicate information about radio resources (e.g., PRACH resources) available for preamble transmission in each (UL) BWP. Alternatively, the RACH Configuration IE may be one of per-UL BWP information elements contained in the UL BWP List IE. Note that, the UL BWPs may include a BWP not used for RACH (preamble transmission).

Likewise, the BWP-related control information may be sent on the X2 interface between the eNB (i.e. MeNB) and the gNB (i.e. SgNB) in (NG-)EN-DC. For example, the BWP-related control information may be contained in a Served Cell information IE and a Neighbour Information IE within an EN-DC (X2) SETUP REQUEST/RESPONSE messages or an EN-DC CONFIGURATION UPDATE/ACKNOWLEDGE messages.

FIG. 14 shows an example of the format of the (DL/UL) BWP List IE. In the example of FIG. 14, the (DL/UL) BWP List IE contains information elements for defining BWPs (i.e., Bandwidth Part Item IEs). Each Bandwidth Part Item IE contains mandatory IEs including a BWP Index IE, a Location IE, a Bandwidth IE, and a Subcarrier spacing IE. The BWP Index IE indicates the BWP index of each BWP. The Location IE indicates the frequency offset from PRB 0 or the cell defining SSB to the lowest PRB of each BWP. The Bandwidth IE indicates the total number of PRBs or the frequency bandwidth of each BWP. The Subcarrier spacing IE indicates subcarrier spacing (SCS) applied to each BWP. The (DL/UL) BWP List IE may contain information indicating the carrier frequency (e.g., ARFCN) of each BWP The Bandwidth Part Item IE shown in FIG. 14 further contains option IEs including an SSB Presence IE and an SSB Position IE. The SSB Presence IE indicates whether or not the BWP contains an SSB in the case of FDD-DL or TDD. The SSB Position IE indicates the time-domain position of the SSB. When the BWP contains no SSB, the Bandwidth Part Item IE may contain information indicating its reference SSB.

Figure 15:
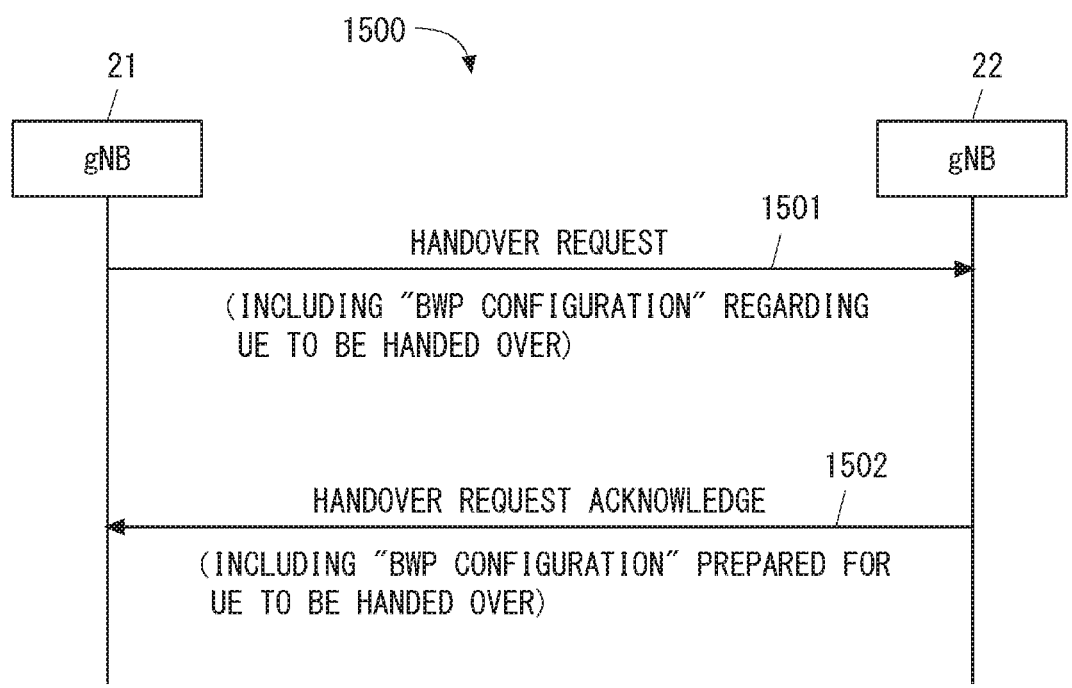
FIG. 15 is a sequence diagram showing an example of inter-node signaling according to the second embodiment.

FIG. 15 shows a process 1500 that is an example of inter-RAN node signaling. FIG. 15 relates to handover of the UE 23. In Step 1501, the source gNB 21 sends, to the target gNB 22, BWP-related control information via a HANDOVER REQUEST message. This BWP-related control information (Step 1501) includes, for example, a BWP configuration regarding the UE 23 to be handed over. To be specific, this BWP-related control information (Step 1501) may contain an information element indicating one or both of: at least one BWP configured for the UE 23 in the source gNB 21; and at least one BWP activated for the UE 23 in the source gNB 21. In addition, or alternatively, this BWP-related control information (Step 1501) may contain an information element indicating at least one candidate BWP to which the UE 23 is to be handed over among the multiple BWPs configured in the target gNB 22.

In Step 1502, the target gNB 22 sends BWP-related control information to the source gNB 21 via a HANDOVER REQUEST ACKNOWLEDGE message. This BWP-related control information (Step 1502) may contain an information element indicating at least one BWP configured (or admitted) for the UE 23 in the target gNB 22.

Figure 16:
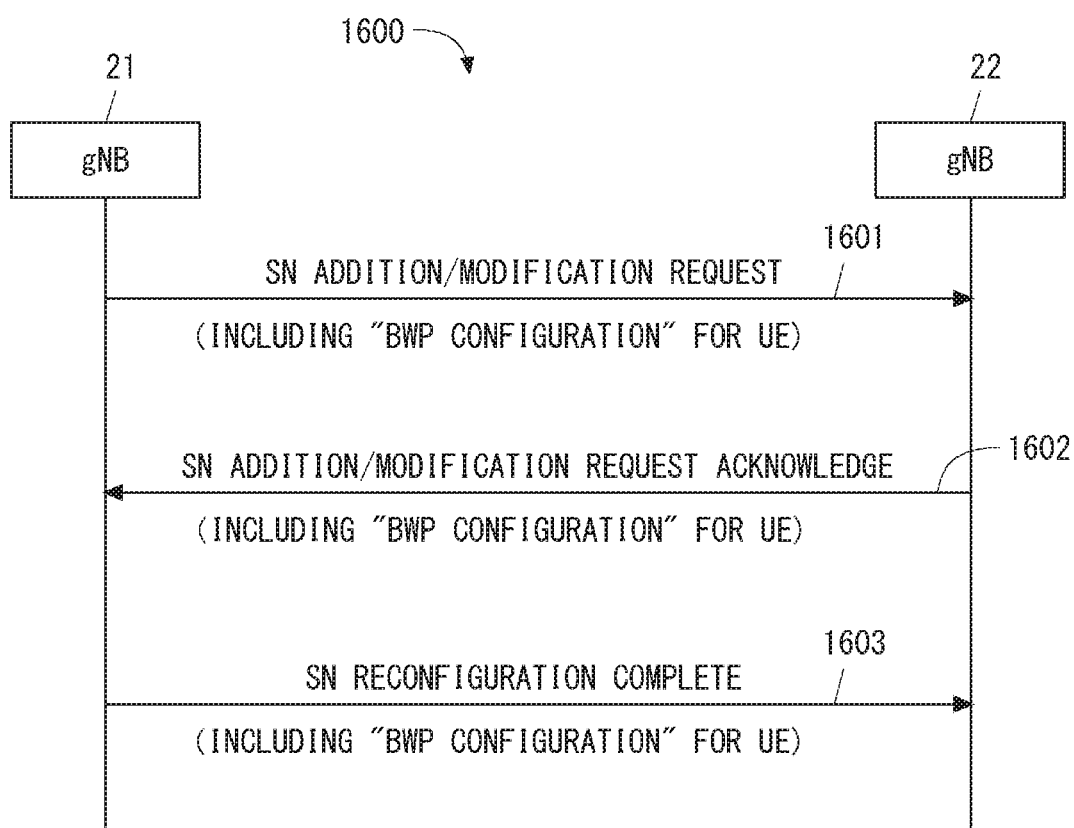
FIG. 16 is a sequence diagram showing an example of inter-node signaling according to the second embodiment.

FIG. 16 shows a process 1600 that is an example of inter-RAN node signaling. FIG. 16 relates to NR-NR DC of the UE 23, in which the gNB 21 is the MN while the gNB 22 is an SN. In Step 1601, the master gNB 21 sends, to the secondary gNB 22, BWP-related control information via an SN ADDITION REQUEST message or an SN MODIFICATION REQUEST message. The SN ADDITION REQUEST message is sent by the master gNB 21 to the secondary gNB 22 to request preparation of resources for dual connectivity for a certain UE. Meanwhile, the SN MODIFICATION REQUEST message is sent by the master gNB 21 to the secondary gNB 22 to request preparation for modification of the secondary gNB resources for a certain UE. This BWP-related control information (Step 1601) contains, for example, an information element indicating at least one candidate BWP to be used as an SCG SCell for NR-NR DC among the multiple BWPs configured in the secondary gNB 22. This information element may be SCG-ConfigInfo IE (i.e., RRC message).

In Step 1602, the secondary gNB 22 sends, to the master gNB 21, BWP-related control information via an SN ADDITION REQUEST ACKNOWLEDGE message or an SN MODIFICATION REQUEST ACKNOWLEDGE message. The SN ADDITION REQUEST ACKNOWLEDGE message is sent by the secondary gNB 22 to the master gNB 21 to confirm the SN addition preparation. Meanwhile, the SN MODIFICATION REQUEST ACKNOWLEDGE message is sent by the secondary gNB 22 to the master gNB 21 to confirm the request from the master gNB for modification of secondary gNB resources. This BWP-related control information (Step 1602) contains, for example, an information element indicating at least one BWP admitted or activated by the secondary gNB 22 to perform NR-NR DC for the UE 23. This information element may be an SCG-ConfigInfo IE (i.e., an RRC message).

In Step 1603, the master gNB 21 sends, to the secondary gNB 22, BWP-related control information via an SN RECONFIGURATION COMPLETE message. The SN RECONFIGURATION COMPLETE message is sent by the master gNB 21 to the secondary gNB 22 to indicate whether the UE 23 has applied the configuration requested by the secondary gNB 22. This BWP-related control information (Step 1603) contains, for example, an information element indicating a BWP configuration applied by the UE 23. This information element may be an SCG-ConfigInfo IE (i.e., an RRC message).

Figure 17:
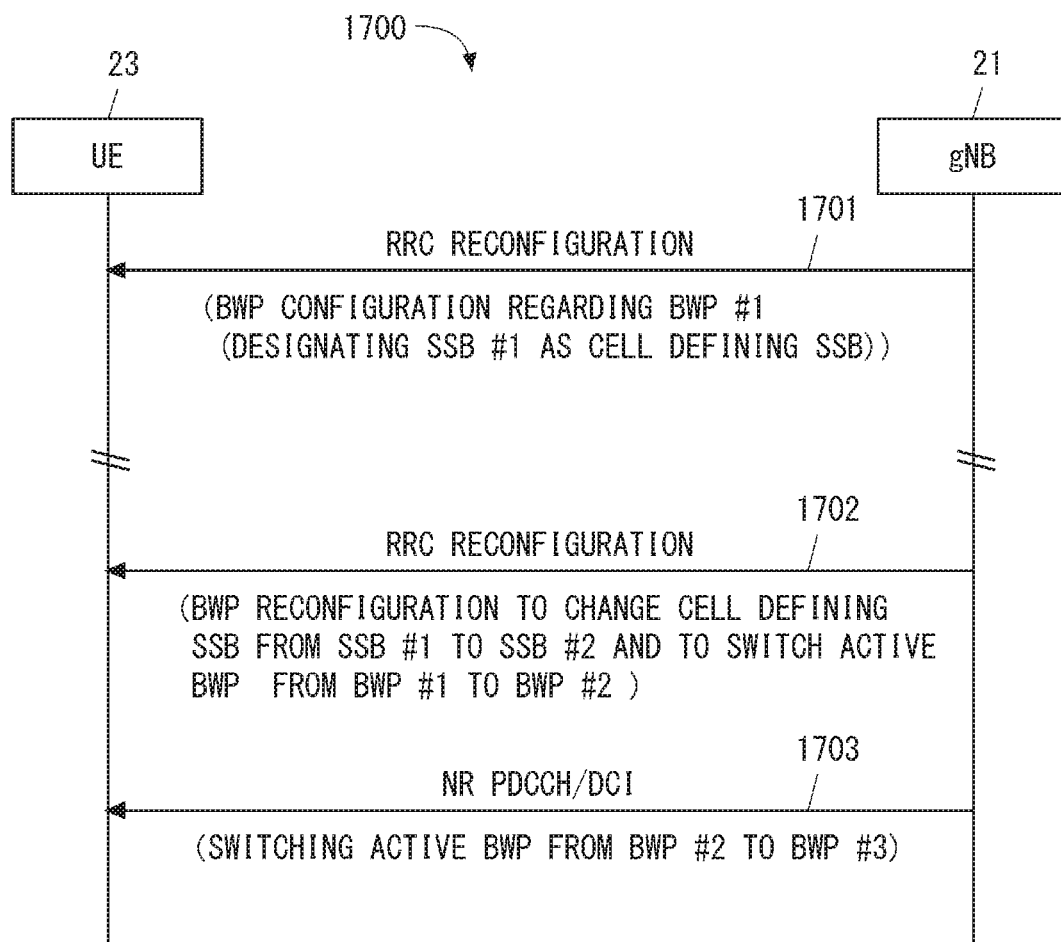
FIG. 17 is a sequence diagram showing an example of signaling between a RAN node and a UE according to the second embodiment.

FIG. 17 shows a process 1700 that is an example of signaling between the gNB 21 and the UE 23. FIG. 17 relates to switching of the active BWP in the configuration example of BWPs and SS/PBCH blocks shown in FIG. 9. It is assumed that, in the initial state, the UE 23 camps on any one of the BWPs contained in the logical cell (Cell #1) of the gNB 21. In Step 1701, the gNB 21 transmits, to the UE 23, an RRC Reconfiguration message containing BWP-related control information for BWP configuration. This RRC Reconfiguration message contains a BWP configuration regarding BWP #1 contained in the logical cell (Cell #1). This BWP configuration indicates SSB #1 as the cell defining SSB.

When the UE 23 has already camped on BWP #1, the UE 23 configures radio parameters (e.g., Layer 2 parameters, L1 parameters) on the basis of this BWP-related control information. When, on the other hand, the UE 23 has camped on a BWP different from BWP #1, the UE 23 changes the active BWP to BWP #1 and configures radio parameters according to this BWP-related control information. The UE 23 may simplify the reconfiguration of Layer 2 because this is mobility between different BWPs belonging to the same logical cell (Cell #1). For example, the UE 23 does not perform re-establishment of the Packet Data Convergence Protocol (PDCP) layer and the Radio Link Control (RLC) layer, and further does not reset the MAC layer. It is thereby expected to reduce the interruption time of data transmission or reception, or to avoid loss of data packets upon BWP change.

In Step 1702, the gNB 21 transmits, to the UE 23, an RRC Reconfiguration message containing BWP-related control information for BWP reconfiguration. This BWP-related control information triggers change of the cell defining SSB from SSB #1 to SSB #2 and change of the active BWP from BWP #1 to BWP #2. The UE 23 changes the active BWP to BWP #2 according to this BWP-related control information. The UE 23 may also simplify reconfiguration of Layer 2 because this is mobility between different BWPs belonging to the same logical cell (Cell #1).

In Step 1703, the gNB 21 transmits DCI on a PDCCH to change the active BWP. This DCI triggers change of the active BWP from BWP #2 to BWP #3. The UE 23 changes the active BWP to BWP #3 according to this DCI. Note that, however, because BWP #3 does not contain any SSBs, the cell defining SSB remains unchanged, which is SSB #2. At this time, the MAC layer (or Physical layer) of the UE 23 may notify the RRC layer of change of the active BWP, and the RRC layer may change the configuration of radio parameters related to radio link control according to need.

Note that, when the UE 23 has camped on any logical cell different from the logical cell (Cell #1) in the initial state before Step 1701 in FIG. 17, the RRC Reconfiguration message in Step 1701 may include an instruction of handover to BWP #1 of the logical cell (Cell #1). The UE 23 may carry out handover according to this instruction.

On the other hand, in the initial state before Step 1701 in FIG. 17, the UE 23 may be in a preparation period to establish (or change) a secondary cell group (SCG) in Dual Connectivity with the gNB 21. In this case, the BWP-related control information for BWP configuration sent by the gNB 21 in Step 1701 may be sent to the UE 23 through the RAN node (not shown) of the master cell group (MCG). For example, in NR-NR DC, the gNB 21 serving as the SgNB may send the BWP-related control information to the Master gNB (MgNB) via an SN ADDITION (or MODIFICATION) REQUEST ACKNOWLEDGE message in the SN Addition (or Modification) procedure. Then, the MgNB may send this BWP-related control information to the UE 23 via an RRC Reconfiguration message. Alternatively, in (NG-)EN-DC, the gNB 21 serving as the SgNB may send the BWP-related control information to the Master eNB (MeNB) via an SN ADDITION REQUEST (or MODIFICATION) ACKNOWLEDGE message in the SN Addition (or Modification) procedure. Then, the MeNB may transmit this BWP-related control information to the UE 23 via an RRC Connection Reconfiguration message. Alternatively, the gNB 21 serving as the SgNB may transmit the BWP-related control information directly to the UE 23 via a signaling bearer (e.g., SRB3) in the SCG. The UE 23 may configure the SCG for Dual Connectivity according to the BWP-related control information received from the RAN node of the MCG or from the gNB 21 (SgNB).

According to this embodiment, it is possible to allow gNBs to share information needed for BWP configuration.

Third Embodiment

Figure 18:
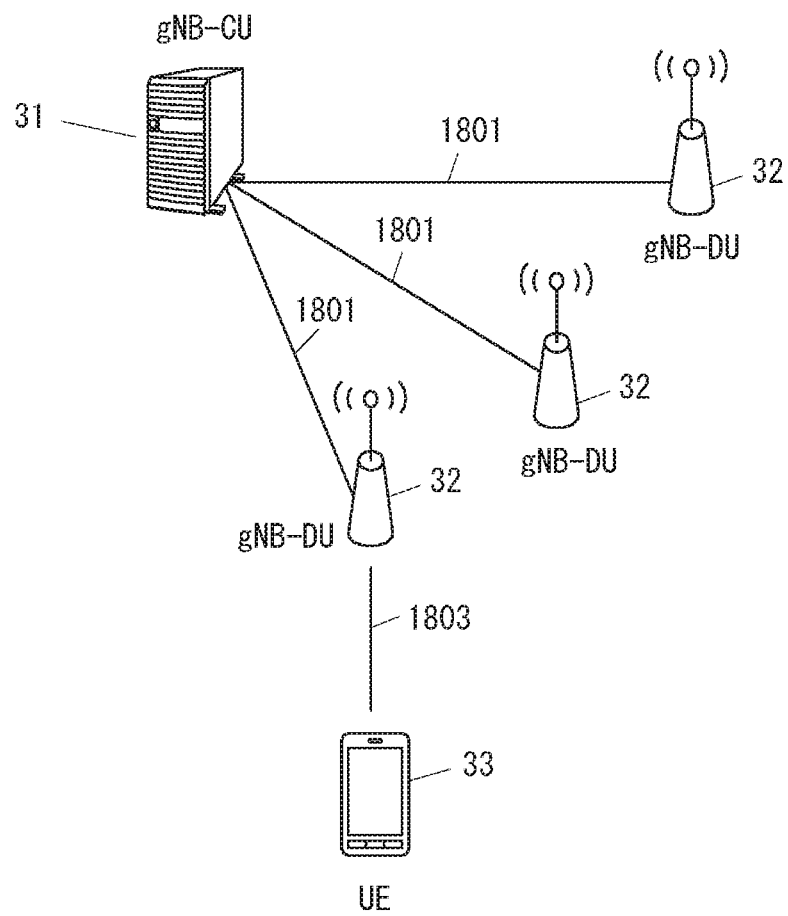
FIG. 18 is a diagram showing a configuration example of a radio communication network according to a third embodiment.

This embodiment provides specific examples of the BWP-related control information described in the first embodiment. FIG. 18 shows a configuration example of a radio communication network according to this embodiment. In the example of FIG. 18, the radio communication network includes a gNB Central Unit (CU) 31, a plurality of gNB Distributed Units (DUs) 32, and a UE 33. The gNB-CU 31 is connected to each gNB-DU 32 through an interface 1801. The interface 1801 is an F1 interface. The UE 33 is connected to at least one gNB-DU 32 through at least one air interface 1802.

In some implementations, the gNB-CU 31 may at least provide the NR RRC functionality, while the gNB-DU 32 may at least provide the NR PHY functionality and NR MAC functionality. In such a functional deployment, the gNB-CU 31 may determine a BWP(s) to be configured in each gNB-DU 32 for the UE 33, and the gNB-CU 31 may notify each gNB-DU 32 of the configuration of the BWP(s) for the UE 33. Further, the gNB-CU 31 may determine a BWP(s) to be activated for the UE 33 and notify each gNB-DU 32 of it. Note that each gNB-DU 32 may change the BWP(s) (i.e. active BWP(s)) to be activated for the UE 33 among the BWP(s) configured by the gNB-CU 31. In other words, each gNB-DU 32 may determine activation/deactivation of a BWP(s).

Alternatively, each gNB-DU 32 may determine a BWP(s) to be configured for the UE 33 and notify the gNB-CU 31 of information about the determined BWP(s). At this time, the gNB-DU 32 may further determine a BWP(s) to be activated for the UE 33 and notify the gNB-CU 31 of information indicating the BWP(s) to be activated for the UE 33. Alternatively, the gNB-CU 31 may determine a BWP(s) to be activated for the UE 33 and notify each gNB-DU 32 of it. Further, each gNB-DU 32 may change the BWP(s) to be activated (i.e. active BWP(s)) for the UE 33, which has been determined autonomously by that gNB-DU (or determined by the gNB-CU 31).

Figure 19:
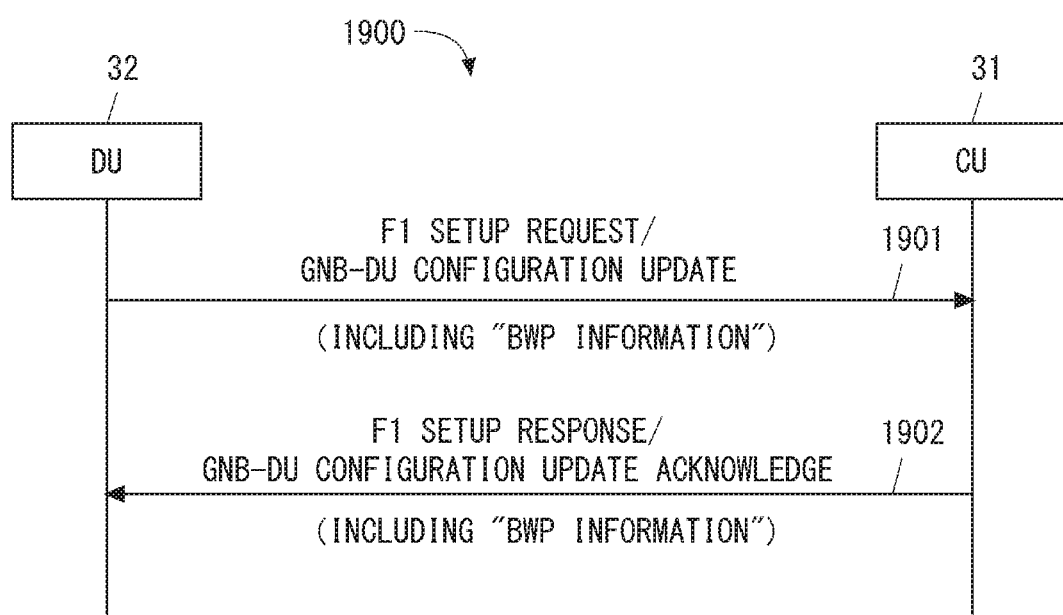
FIG. 19 is a sequence diagram showing an example of inter-node signaling according to the third embodiment.

FIG. 19 shows a process 1900 that is an example of inter-RAN node signaling. FIG. 19 relates to configuration (or establishment) and update of the interface (i.e., F1 interface) between the gNB-CU 31 and the gNB-DU 32. In Step 1901, the gNB-DU 32 sends, to the gNB-CU 31, an F1 SETUP REQUEST message or a GNB-DU CONFIGURATION UPDATE message. The F1 SETUP REQUEST message is sent from the gNB-DU 32 to the gNB-CU 31 to establish the F1 interface. Meanwhile, the GNB-DU CONFIGURATION UPDATE message is sent from the gNB-DU 32 to the gNB-CU 31 to notify the gNB-CU 31 of update of the established F1 interface or configuration update of the gNB-DU 32.

In Step 1902, the gNB-CU 31 sends, to the gNB-DU 32, an F1 SETUP RESPONSE message or a GNB-DU CONFIGURATION UPDATE ACKNOWLEDGE message. The F1 SETUP RESPONSE message is a response to the F1 SETUP REQUEST message. The GNB-DU CONFIGURATION UPDATE ACKNOWLEDGE message is a response to the GNB-DU CONFIGURATION UPDATE message.

The F1 SETUP REQUEST message or the GNB-DU CONFIGURATION UPDATE message in Step 1901 may include BWP-related control information. The BWP-related control information sent in Step 1901 may contain, for example, at least one of the information elements (IEs) contained in the above-described BWP-related control information described above. In addition, or alternatively, this BWP-related control information may contain information regarding at least one of: a BWP supported by the gNB-DU 32; a BWP that has been determined by the gNB-DU 32 to be operated (or a BWP to be operated by the gNB-DU 32); and a BWP that has been updated by the gNB-DU 32.

The F1 SETUP RESPONSE message or the GNB-DU CONFIGURATION UPDATE ACKNOWLEDGE message in Step 1902 may also include BWP-related control information. The BWP-related control information sent in Step 1902 may contain at least one of the information elements (IEs) contained in the BWP-related control information described above. In addition, or alternatively, this BWP-related control information may contain, for example, information regarding at least one of: information indicating a BWP(s) accepted (or admitted) by the gNB-CU 31 among (a list of) candidate BWPs of which the gNB-DU 32 has notified the gNB-CU 31; information indicating a BWP(s) that the gNB-CU 31 instructs the gNB-DU 32 to activate; and a request by the gNB-CU 31 for change in the construction (e.g., SS sequence or PCI, or SSB presence) of a BWP(s).

Figure 20:
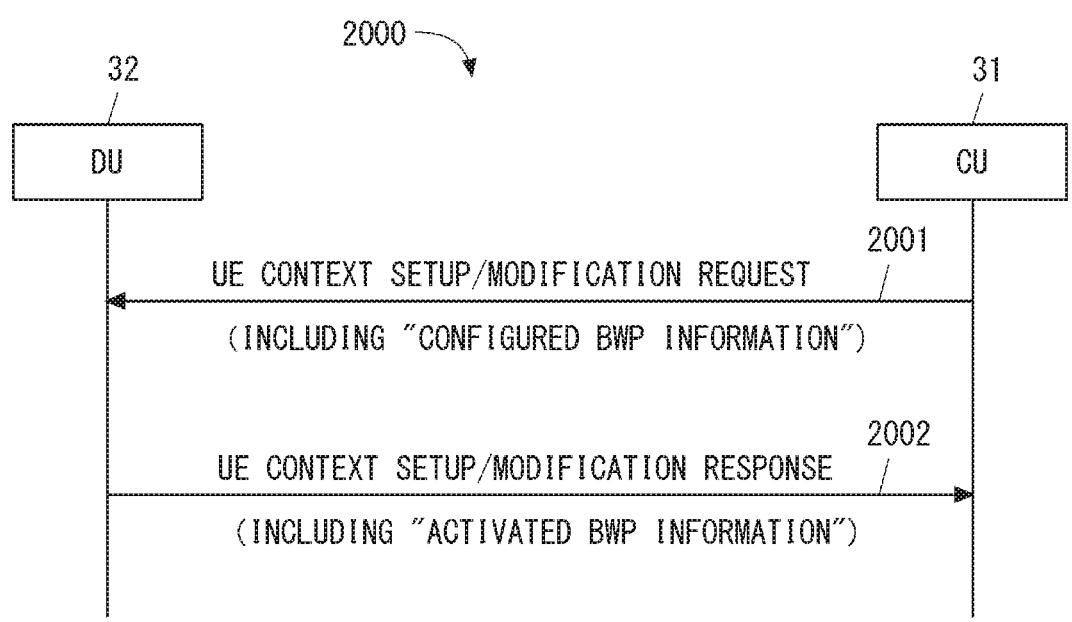
FIG. 20 is a sequence diagram showing an example of inter-node signaling according to the third embodiment.

FIG. 20 shows a process 2000 that is an example of inter-RAN node signaling. In Step 2001, the gNB-CU 31 sends, to the gNB-DU 32, BWP-related control information via a UE CONTEXT SETUP REQUEST message or a UE CONTEXT MODIFICATION REQUEST message. This BWP-related control information (Step 2001) contains an information element (configured BWP information) indicating one or more BWPs to be configured by the gNB-CU 31 for the UE 33 connected to the gNB-DU 32.

In Step 2002, the gNB-DU 32 sends, to the gNB-CU 31, BWP-related control information via a UE CONTEXT SETUP RESPONSE message or a UE CONTEXT MODIFICATION RESPONSE message. The BWP-related control information in Step 2002 contains BWP Configuration Status Information about UE-specific configuration status of the BWP. This BWP Configuration Status information (Step 2002) contains, for example, an information element indicating which one among the one or more BWPs configured by the gNB-CU 31 is to be activated for the UE 33 at the gNB-DU 32.

The message in Step 2001 may also be referred to as a UE UP CONTEXT SETUP REQUEST message or a UE UP CONTEXT MODIFICATION REQUEST message. Further, the message in Step 2002 may also be referred to as a UE UP CONTEXT SETUP RESPONSE message or a UE UP CONTEXT MODIFICATION RESPONSE message. Furthermore, the relationship between the source and the destination of each of these messages may be reversed.

In addition, or alternatively, when changing the active BWP of the UE 33 by, for example, DCI transmitted on a NR PDCCH, the gNB-DU 32 may inform the gNB-CU 31 that the active BWP is going to be changed (or has changed), or may inform the gNB-CU 31 about the BWP index of the active BWP after change. In other words, the gNB-DU 32 may notify the gNB-CU 31 of update of the UE-specific BWP configuration status information. Accordingly, the gNB-CU 31 can be aware of which BWP has been activated for the UE 33. The gNB-CU 31 can thereby appropriately change (or reconfigure) radio resource configuration (e.g., measurement configuration, Layer 2 configuration) via an RRC Reconfiguration message, according to the radio environment or load status in this active BWP and other BWPs (or cells). It is thus expected to maintain or improve the radio performance (e.g., throughput performance, service quality) of the UE 33.

In addition, or alternatively, each gNB-DU 32 may send, to the gNB-CU 31, BWP-related control information containing an information element indicating the availability of network slicing which this gNB-DU 32 can support in each BWP. The gNB-CU 31 may determine, on the basis of this control information, the gNB-DU 32 which the UE 33 should be connected to, or the BWP which the UE 33 should use.

According to this embodiment, it is possible to allow the gNB-CU 31 and the gNB-DU 32 to share information needed for BWP configuration.

Fourth Embodiment

Figure 21:
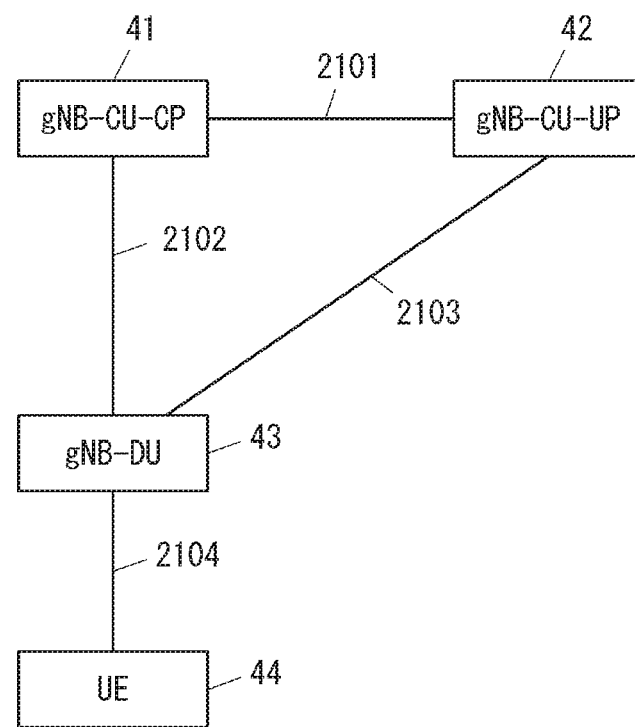
FIG. 21 is a diagram showing a configuration example of a radio communication network according to a fourth embodiment.

This embodiment provides specific examples of the BWP-related control information described in the first embodiment. FIG. 21 shows a configuration example of a radio communication network according to this embodiment. In the example of FIG. 21, the radio communication network includes a Control Plane (CP) Unit (gNB-CU-CP) 41 and a User Plane (UP) Unit (gNB-CU-UP) 42 of a gNB Central Unit (CU), a gNB Distributed Unit (DU) 43, and a UE 44.

The gNB-CU-CP 41 is connected to the gNB-CU-UP 42 through an interface 2101. The interface 2101 is an E1 interface. The gNB-CU-CP 41 is connected to the gNB-DU 43 through an interface 2102. The interface 2102 is an F1-C interface. The gNB-CU-UP 42 is connected to the gNB-DU 43 through an interface 2103. The interface 2103 is an F1-U interface. The UE 44 is connected to at least one gNB-DU 43 through at least one air interface 2104.

In some implementations, the gNB-CU-CP 41 may at least provide the NR RRC functionality and at least part of the PDCP functionality (e.g., functions required for RRC and NAS signaling). The gNB-CU-UP 42 may at least provide at least part of the NR PDCP functionality (e.g., function required for UP data). The gNB-DU 43 may at least provide the NR PHY functionality and NR MAC functionality. In such a functional deployment, the gNB-CU-CP 41 may determine a BWP(s) to be configured in the gNB-DU 43 for the UE 44, and the gNB-CU-CP 41 may configure the gNB-CU-UP 42 and the gNB-DU 43 with the BWP(s). Note that exchange and control of information about BWPs between the gNB-CU-CP 41 and the gNB-DU 43 may be the same as those between the gNB-CU 31 and the gNB-DU 32 in the third embodiment (FIG. 18).

Figure 22:
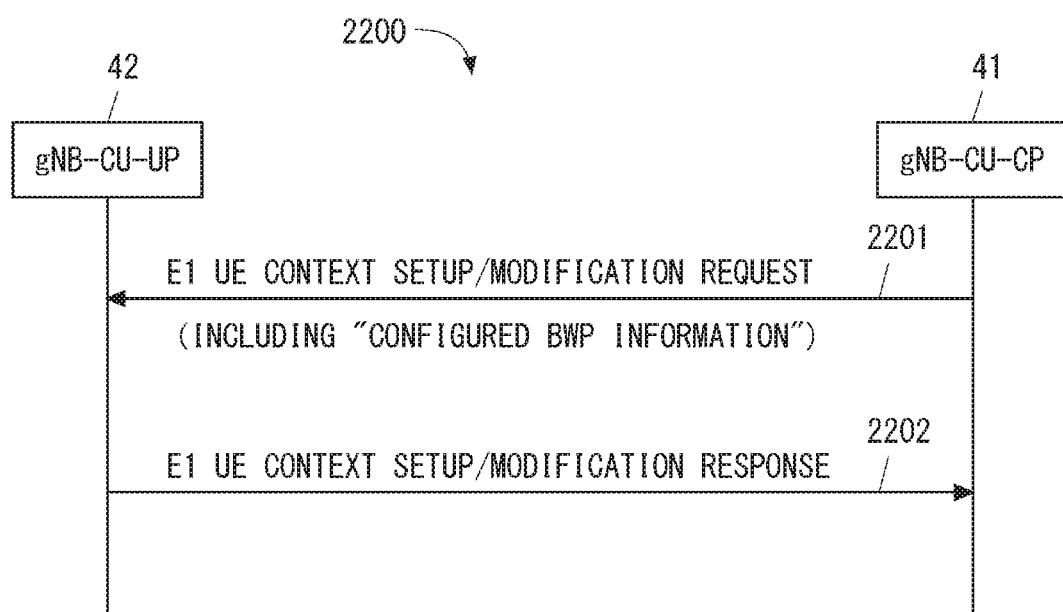
FIG. 22 is a sequence diagram showing an example of inter-node signaling according to the fourth embodiment.

FIG. 22 shows a process 2200 that is an example of inter-RAN node signaling. In Step 2201, the gNB-CU-CP 41 sends, to the gNB-CU-UP 42, BWP-related control information via an E1 UE CONTEXT SETUP REQUEST message or an E1 UE CONTEXT MODIFICATION REQUEST message. This BWP-related control information (Step 2201) contains an information element (configured BWP information) indicating one or more BWPs to be configured by the gNB-CU-CP 41 for the UE 44 connected to this gNB-CU-UP 42.

In Step 2202, the gNB-CU-UP 42 sends, to the gNB-CU-CP 41, BWP-related control information via an E1 UE CONTEXT SETUP RESPONSE message or an E1 UE CONTEXT MODIFICATION RESPONSE. The BWP-related control information in Step 2202 contains BWP Configuration Status Information regarding UE-specific configuration status of the BWP.

The message in Step 2201 may be referred to as an E1 UE UP CONTEXT SETUP REQUEST message or a UE UP CONTEXT MODIFICATION REQUEST message. Further, the message in Step 2202 may be referred to as an E1 UE UP CONTEXT SETUP RESPONSE message or a UE UP CONTEXT MODIFICATION RESPONSE message. Furthermore, the relationship between the source and the destination of each of these messages may be reversed.

Figure 23:
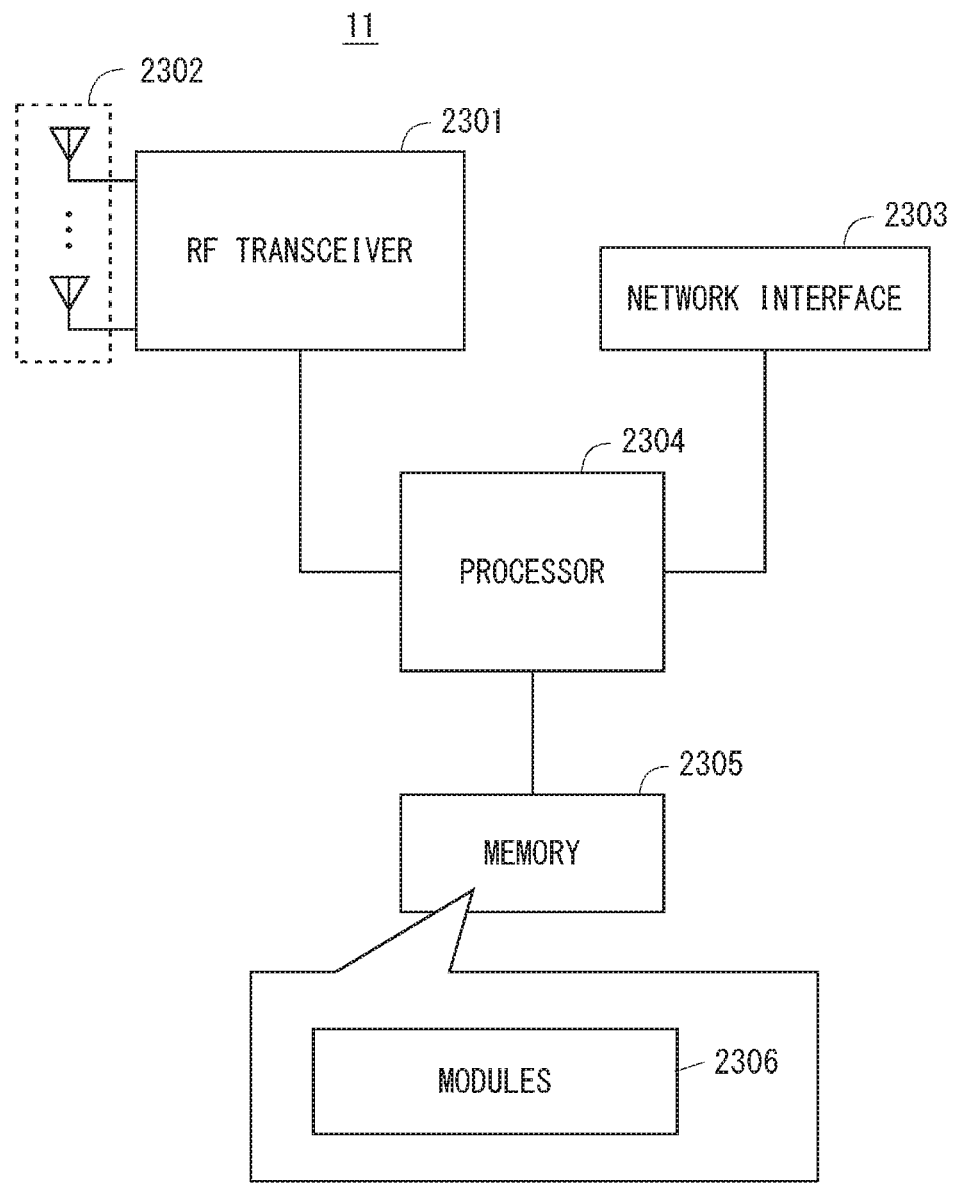
FIG. 23 is a block diagram showing a configuration example of a RAN node according to some embodiments.

The following provides configuration examples of the RAN node 11, the gNB 21, the gNB 22, the gNB-CU 31, the gNB-DU 32, the UE 23, the UE33, and the UE 44 according to the above embodiments. FIG. 23 is a block diagram showing a configuration example of the RAN node 11 according to the above embodiments. Referring to FIG. 23, the RAN node 11 includes a Radio Frequency transceiver 2301, a network interface 2303, a processor 2304, and a memory 2305. The RF transceiver 2301 performs analog RF signal processing to communicate with NG UEs including the UE 12. The RF transceiver 2301 may include a plurality of transceivers. The RF transceiver 2301 is coupled to an antenna array 2302 and the processor 2304. The RF transceiver 2301 receives modulated symbol data from the processor 2304, generates a transmission RF signal, and supplies the transmission RF signal to the antenna array 2302.

Further, the RF transceiver 2301 generates a baseband reception signal based on a reception RF signal received by the antenna array 2302, and supplies the baseband reception signal to the processor 2304. The RF transceiver 2301 may include an analog beamformer circuit for beam forming. The analog beamformer circuit includes, for example, a plurality of phase shifters and a plurality of power amplifiers.

The network interface 2003 is used to communicate with a network node (e.g., a control node and a transfer node of NO Core). The network interface 2003 may include, for example, a network interface card (NIC) conforming to the IEEE 802.3 series.

The processor 2304 performs digital baseband signal processing (i.e., data-plane processing) and control-plane processing for radio communication. The processor 2304 may include a plurality of processors. The processor 2304 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 2304 may include a digital beamformer module for beam forming. The digital beamformer module may include a Multiple Input Multiple Output (MIMO) encoder and a pre-coder.

The memory 2305 is composed of a combination of a volatile memory and a non-volatile memory. The volatile memory is, for example, a Static Random Access Memory (SRAM), a Dynamic RAM (DRAM), or any combination thereof. The non-volatile memory is, for example, a mask Read Only Memory (MROM), an Electrically Erasable Programmable ROM (EEPROM), a flash memory, a hard disc drive, or any combination thereof. The memory 2305 may include a storage located apart from the processor 2304. In this case, the processor 2304 may access the memory 2305 via the network interface 2303 or an I/O interface (not shown).

The memory 2305 may store one or more software modules (computer programs) 2306 including instructions and data to perform processing by the RAN node 11 described in the above embodiments. In some implementations, the processor 2304 may be configured to load the software modules 2306 from the memory 2305 and execute the loaded software modules, thereby performing processing of the RAN node 11 described in the above embodiments.

Each of the gNB 21, the gNB 22, the gNB-CU 31, and the gNB-DU 32 may have a configuration similar to that shown in FIG. 23. The gNB-CU 31, however, does not need to include the RF transceiver 2301 (and the antenna array 2302).

Figure 24:
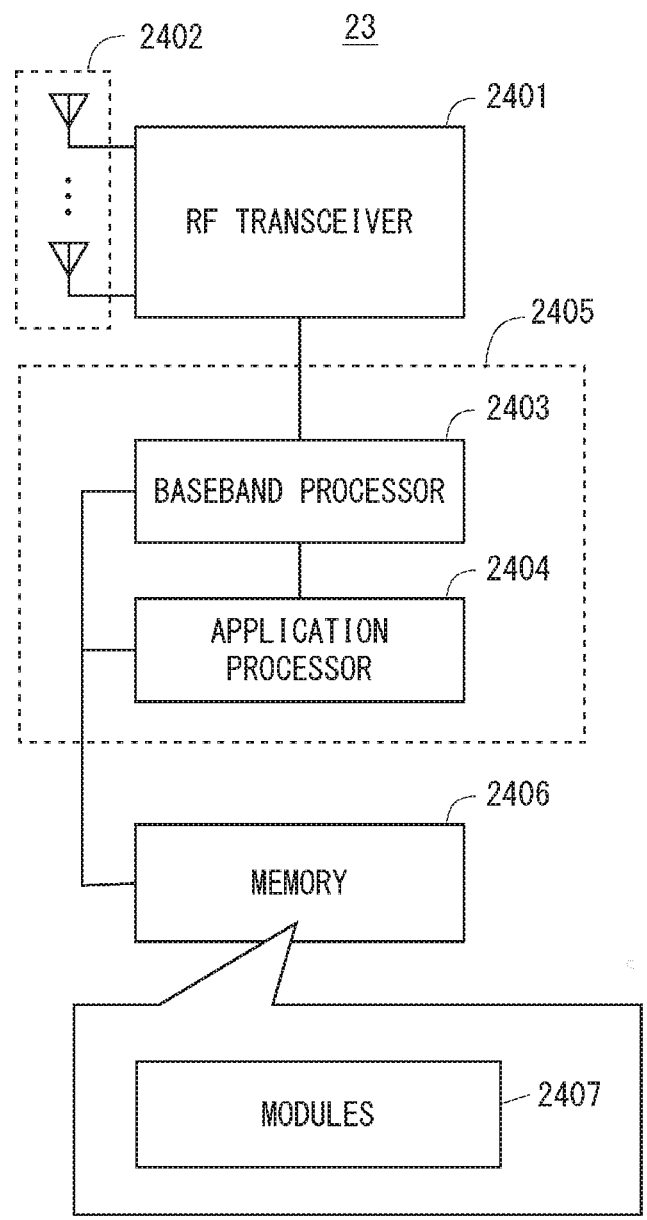
FIG. 24 is a block diagram showing a configuration example of a radio terminal according to some embodiments.

FIG. 24 is a block diagram showing a configuration example of the UE 23. Each of the UE 33 and the UE 44 may have a configuration similar to that shown in FIG. 24. A Radio Frequency (RF) transceiver 2401 performs analog RF signal processing to communicate with the NR NB 1. The RF transceiver 2401 may include a plurality of transceivers. The analog RF signal processing performed by the RF transceiver 2401 includes frequency up-conversion, frequency down-conversion, and amplification. The RF transceiver 2401 is coupled to an antenna array 2402 and a baseband processor 2403. The RF transceiver 2401 receives modulated symbol data (or OFDM symbol data) from the baseband processor 2403, generates a transmission RF signal, and supplies the transmission RF signal to the antenna array 2402. Further, the RF transceiver 2401 generates a baseband reception signal based on a reception RF signal received by the antenna array 2402, and supplies the baseband reception signal to the baseband processor 2403. The RF transceiver 2401 may include an analog beamformer circuit for beam forming. The analog beamformer circuit includes, for example, a plurality of phase shifters and a plurality of power amplifiers.

The baseband processor 2403 performs digital baseband signal processing (i.e., data-plane processing) and control-plane processing for radio communication. The digital baseband signal processing includes (a) data compression/decompression, (b) data segmentation/concatenation. (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 2403 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 2403 may include processing of a Non-Access Stratum (NAS) protocol, an RRC protocol, and MAC CEs.

The baseband processor 2403 may perform MIMO encoding and pre-coding for beam forming.

The baseband processor 2403 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 2404 described in the following.

The application processor 2404 is also referred to as a CPU, an MPU, a microprocessor, or a processor core. The application processor 2404 may include a plurality of processors (processor cores). The application processor 2404 loads a system software program (Operating System (OS)) and various application programs (e.g., a call application, a WEB browser, a mailer, a camera operation application, and a music player application) from a memory 2406 or from another memory (not shown) and executes these programs, thereby providing various functions of the UE 23.

In some implementations, as represented by a dashed line (2405) in FIG. 24, the baseband processor 2403 and the application processor 2404 may be integrated on a single chip. In other words, the baseband processor 2403 and the application processor 2404 may be implemented in a single System on Chip (SoC) device 2405. An SoC device may be referred to as a system Large Scale Integration (LSI) or a chipset.

The memory 2406 is a volatile memory, a non-volatile memory, or a combination thereof. The memory 2406 may include a plurality of memory devices that are physically independent from each other. The volatile memory is, for example, an SRAM, a DRAM, or any combination thereof. The non-volatile memory is, for example, an MROM, an EEPROM, a flash memory, a hard disc drive, or any combination thereof. The memory 2406 may include, for example, an external memory device that can be accessed from the baseband processor 2403, the application processor 2404, and the SoC 2405. The memory 2406 may include an internal memory device that is integrated in the baseband processor 2403, the application processor 2404, or the SoC 2405. Further, the memory 2406 may include a memory in a Universal Integrated Circuit Card (UICC).

The memory 2406 may store one or more software modules (computer programs) 2407 including instructions and data to perform the processing by the UE 23 described in the above embodiments. In some implementations, the baseband processor 2403 or the application processor 2404 may load these software modules 2407 from the memory 2406 and execute the loaded software modules, thereby performing the processing of the UE 23 described in the above embodiments with reference to the drawings.

Note that, the control plane processes and operations described in the above embodiments can be achieved by the elements other than the RF transceiver 2401 and the antenna array 2202, i.e., achieved by the memory storing the software modules 2407 and at least one of the baseband processor 2403 and the application processor 2404.

As described above with reference to FIGS. 23 and 24, each of the processors included in the RAN node 11, the gNB 21, the gNB 22, the gNB-CU 31, the gNB-DU 32, the UE 23 and the UE33 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

Each of the above-described embodiments may be used individually, or two or more embodiments may be appropriately combined with one another.

In the above embodiments, switching of the active BWP by DCI transmitted on a NR PDCCH is described. Note that, however, switching of the active BWP in the above-described embodiments may be done by a MAC CE or a timer (e.g., BWP Inactivity Timer).

The above embodiments are described mainly based on the assumption that only one BWP is activated for each UE (i.e. 1 active BWP per UE). However, the methods described in the above embodiments are also applicable to the case where multiple BWPs are simultaneously activated for a UE as a matter of course. For example, there are multiple active BWPs in a BWP set. Further, there are multiple active BWPs each corresponding to a respective one of multiple BWP groups configured in a BWP set, or there are multiple active BWPs in a BWP group.

In the above embodiments, the UE 23 (33, 44) may support multiple (DL/UL) active BWPs in one component carrier channel bandwidth. In this case, the UE 23 (33, 44) may perform signal processing (e.g., signal transmission and reception, TB/PDU generation, and baseband processing) individually on multiple BWPs managed by one (common) MAC entity, like the PCell and SCell of the existing LTE carrier aggregation. Alternatively, the UE 23 (33, 44) may perform signal processing on one wideband BWP (or wideband cell) consisting of the multiple BWPs. The UE 23 (33, 44) may establish a bearer (i.e., SRB, DRB) for a specific active BWP. The UE 23 (33, 44) may transmit the same information regarding one bearer (i.e., control signaling, data) on the multiple active BWPs (i.e., duplication). Establishment of a bearer for a specific active BWP and duplication transmission in multiple active BWPs may be configured with a Logical Channel ID.

The above embodiments may be used for Supplemental Uplink (SUL) discussed by the 3GPP in place of BWPs. The SUL uses high-frequency band uplink (UL) and downlink (DL) carriers as a basic component of a cell and also uses a low-frequency band UL carrier as an additional carrier (i.e., SUL carrier). The SUL carrier is treated as a part of the UL carrier associated with the high-frequency band DL carrier, and thus it is not treated as a secondary cell consisting of a UL carrier only. To be specific, RAN nodes may exchange SUL-related information for configuration and switching of a UL carrier for SUL. For example, the SUL-related information may contain, for example, information indicating that the BWP corresponding to the SUL carrier is a SUL carrier (e.g., BWP Type=SUL, SUL Index). The bandwidth of the BWP corresponding to the SUL carrier may be smaller than the SSB bandwidth.

The above embodiments can ensure the RAN node to appropriately be aware of and manage the active BWP for the UE. When the UE transitions from Connected mode (e.g., NR RRC_Connected) to Idle mode (e.g., NR RRC_Idle), the RAN node may notify the CN node of information about the active BWP of the UE. In other words, the RAN node (e.g., gNB) may send, to the CN node (e.g., AMF), information about the active BWP of the UE that releases RRC connection and NG connection. The information about the active BWP contains, for example, the index of the active BWP (or its corresponding PCI) on which the UE stayed last time and Cell Identity information containing it. This information may be sent by a UE CONTEXT RELEASE REQUEST message or a UE CONTEXT RELEASE COMPLETE message from the RAN node to the CN node. The CN node may use (or refer to) the information about the active BWP when it page the UE, which occurs later. In addition, or alternatively, the CN node may send the information about the active BWP, together with a paging message, to the RAN node, and the RAN node may use (or refer to) this information in determination of a paging destination (cell or BWP).

For example, transmission of a paging message in the first paging occasion may be done in only this BWP. BWPs associated with this BWP, or multiple or all BWPs of the logical cell containing this BWP. It is thus possible to reduce cells (BWPs) in which a paging message is transmitted, thereby reducing signaling overhead and network power consumption while maintaining the probability that this paging message reaches the target UE at a specified target value.

Although the term "cell defining SSB" is used in the above embodiments, it may be referred to as a cell representative SSB because it is an SSB that is representative of a BWP corresponding to the cell from the UE perspective (i.e., physical cell) or of a BWP group corresponding to a set of the physical cells. Alternatively, the cell defining SSB may be referred to as a cell-specific SSB because it specifies a representative cell (physical cell) including this SSB. Further, the cell defining SSB may be referred to as a serving SSB because it is an SSB to be monitored when the UE camps on a BWP or BWP group including this SSB.

The sub-PCI described in the above embodiments may be associated with a BWP index.

The base BWP described in the above embodiments may be referred to as a default BWP, an initial BWP, a reference BWP, a primary BWP, an anchor BWP, or a master BWP. Specifically, the BWP on which the UE first camps when accessing the RAN node for the first time (i.e., when transitioning from Idle mode to Connected mode) may be referred to as a base BWP, a default BWP, an initial BWP, a reference BWP, a primary BWP, an anchor BWP, or a master BWP. In addition, or alternatively, a BWP which is not the base BWP among multiple BWPs included in one system bandwidth may be referred to as a sub-BWP, a secondary BWP, or a slave BWP.

Further, the above-described embodiments are merely examples of applications of the technical ideas obtained by the inventors. These technical ideas are not limited to the above-described embodiments and various modifications can be made thereto.

For example, the whole or part of the above embodiments can be described as, but not limited to, the following supplementary notes.

(Supplementary Note 1)

A radio access network (RAN) node apparatus comprising:
a memory; and
at least one processor coupled to the memory and configured to send, to another RAN node, first control information regarding at least one of one or more bandwidth parts (BWPs) configured in a system bandwidth.

(Supplementary Note 2)

The RAN node apparatus according to Claim 1, wherein the first control information contains at least one of the following information elements:
an information element indicating one or more BWP indices associated with one or more downlink BWPs;
an information element indicating one or more BWP indices associated with one or more uplink BWPs;
an information element indicating an Absolute Radio Frequency Channel Number (ARFCN) associated with each BWP;
an information element indicating whether each BWP contains a Synchronization Signal block (SSB);
an information element indicating a reference SSB associated with a BWP not containing any SSBs, or indicating a reference BWP that contains the reference SSB;
an information element indicating a construction of an SSB to be transmitted on each BWP; and
an information element indicating a numerology with which the each BWP is configured.

(Supplementary Note 3)

The RAN node apparatus according to Claim 1 or 2, wherein the first control information contains an information element indicating a relationship between one logical cell identifier associated with a cell corresponding to the system bandwidth and a Physical Cell Identity (PCI) associated with each BWP of the one or more BWPs.

(Supplementary Note 4)

The RAN node apparatus according to Claim 2 or 3, wherein the first control information further contains one or both of: an information element indicating availability of network slicing in each BWP or each BWP set; and an information element indicating quality of service (QoS) supported by each BWP or each BWP set.

(Supplementary Note 5)

The RAN node apparatus according to any one of Claims 1 to 4, wherein the RAN node apparatus includes a Central Unit (CU) at least providing Radio Resource Control (RRC) functionality, the other RAN node includes a Distributed Unit (DU) at least providing Medium Access Control (MAC) functionality, and the at least one processor is configured to, in response to receiving, from the other RAN node, second control information indicating one or more BWPs supported by the DU, send to the other RAN node the first control information containing an information element indicating an admitted BWP among the one or more BWPs supported by the DU.

(Supplementary Note 6)

The RAN node apparatus according to any one of Claims 1 to 4, wherein the RAN node apparatus includes a Central Unit (CU) at least providing Radio Resource Control (RRC) functionality, the other RAN node includes a Distributed Unit (DU) at least providing Medium Access Control (MAC) functionality, the first control information contains an information element indicating one or more BWPs configured by the CU for a radio terminal connected to the DU, and the at least one processor is configured to send, to the other RAN node, third control information containing an information element indicating which one among the one or more BWPs configured by the CU is to be activated at the DU for the radio terminal.

(Supplementary Note 7)

The RAN node apparatus according to Claim 6, wherein the at least one processor is configured to receive, from the other RAN node, fourth control information containing an information element indicating a BWP to be activated for the radio terminal connected to the DU, which has been determined or changed by the DU.

(Supplementary Note 8)

The RAN node apparatus according to any one of Claims 1 to 4, wherein the at least one processor is configured to send, to the other RAN node, the first control information when a radio terminal is handed over from the RAN node apparatus to the other RAN node, and the first control information contains an information element indicating one or both of: at least one BWP configured in the RAN node apparatus for the radio terminal; and at least one BWP activated at the RAN node apparatus for the radio terminal.

(Supplementary Note 9)

The RAN node apparatus according to any one of Claims 1 to 4, wherein the at least one processor is configured to send, to the other RAN node, the first control information when a radio terminal is handed over from the RAN node apparatus to the other RAN node, and the first control information contains an information element indicating at least one candidate BWP to which the radio terminal is to be handed over among multiple BWPs configured in the other RAN node.

(Supplementary Note 10)

The RAN node apparatus according to any one of Claims 1 to 4, wherein the at least one processor is configured to send, to the other RAN node, the first control information when a radio terminal is handed over from the other RAN node to the RAN node apparatus, and the first control information contains an information element indicating at least one BWP configured in the RAN node apparatus for the radio terminal.

(Supplementary Note 11)

The RAN node apparatus according to any one of Claims 1 to 4, wherein the at least one processor is configured to send, to the other RAN node, the first control information when performing dual connectivity for a radio terminal in cooperation with the other RAN node, and the first control information contains an information element indicating at least one candidate BWP to be used for the dual connectivity among multiple BWPs configured in the other RAN node.

(Supplementary Note 12)

The RAN node apparatus according to Claim 11, wherein the at least one processor is configured to receive, from the other RAN node, fifth control information containing an information element indicating at least one BWP activated for performing the dual connectivity in the other RAN node.

(Supplementary Note 13)

A method for a radio access network (RAN) node apparatus, the method comprising:

sending, to another RAN node, first control information regarding at least one of one or more bandwidth parts (BWPs) configured in a system bandwidth.

(Supplementary Note 14)

The method according to Claim 13, wherein the first control information contains at least one of the following information elements:

an information element indicating one or more BWP indices associated with one or more downlink BWPs;

an information element indicating one or more BWP indices associated with one or more uplink BWPs;

an information element indicating an Absolute Radio Frequency Channel Number (ARFCN) associated with each BWP;

an information element indicating whether each BWP contains a Synchronization Signal block (SSB);

an information element indicating a reference SSB associated with a BWP not containing any SSBs, or indicating a reference BWP that contains the reference SSB;

an information element indicating a construction of an SSB to be transmitted on each BWP; and an information element indicating a numerology with which the each BWP is configured.

(Supplementary Note 15)

The method according to Claim 13 or 14, wherein the first control information contains an information element indicating a relationship between one logical cell identifier associated with a cell corresponding to the system bandwidth and a Physical Cell Identity (PCI) associated with each BWP of the one or more BWPs.

(Supplementary Note 16)

The method according to Claim 14 or 15, wherein the first control information further contains one or both of: an information element indicating availability of network slicing in each BWP or each BWP set; and an information element indicating quality of service (QoS) supported by each BWP or each BWP set.

27

(Supplementary Note 17)
The method according to any one of Claims 13 to 16, wherein
the RAN node apparatus includes a Central Unit (CU) at least providing Radio Resource Control (RRC) functionality,
the other RAN node includes a Distributed Unit (DU) at least providing Medium Access Control (MAC) functionality, and
the sending comprises, in response to receiving, from the other RAN node, second control information indicating one or more BWPs supported by the DU, sending to the other RAN node the first control information containing an information element indicating an admitted BWP among the one or more BWPs supported by the DU.

(Supplementary Note 18)
The method according to any one of Claims 13 to 16, wherein
the RAN node apparatus includes a Central Unit (CU) at least providing Radio Resource Control (RRC) functionality,
the other RAN node includes a Distributed Unit (DU) at least providing Medium Access Control (MAC) functionality,
the first control information contains an information element indicating one or more BWPs configured by the CU for a radio terminal connected to the DU, and
the method further comprises sending, to the other RAN node, third control information containing an information element indicating which one among the one or more BWPs configured by the CU is to be activated at the DU for the radio terminal.

(Supplementary Note 19)
The method according to Claim 18, further comprising receiving, from the other RAN node, fourth control information containing an information element indicating a BWP to be activated for the radio terminal connected to the DU, which has been determined or changed by the DU.

(Supplementary Note 20)
A program for causing a computer to perform a method for a radio access network (RAN) node apparatus, wherein the method comprises:
sending, to another RAN node, first control information regarding at least one of one or more bandwidth parts (BWPs) configured in a system bandwidth.

This application is based upon and claims the benefit of priority from Japanese Patent Application No. 2017-218041, filed on Nov. 13, 2017, the disclosure of which is incorporated herein in its entirety by reference.

REFERENCE SIGNS LIST 11, 12 RAN NODE
21, 22 gNB
31 gNB-CU
32 gNB-DU
41 gNB-CU-CP
42 gNB-CU-UP
43 gNB-DU
23, 33, 44 UE
1001 INTERFACE
1201 Xn INTERFACE
1801 F1 INTERFACE
2304 PROCESSOR
2305 MEMORY
2403 BASEBAND PROCESSOR
2404 APPLICATION PROCESSOR
2406 MEMORY

28

The invention claimed is:
1. A method for a gNB Distributed Unit (gNB-DU) hosting a Physical (PHY) layer and a Medium Access Control (MAC) layer, the method comprising:
communicating with a User Equipment (UE); and
sending, via an F1 interface, a message to a gNB Central Unit (gNB-CU) hosting a Radio Resource Control (RRC) layer, the message including first information indicating one or more bandwidth parts to be configured for the UE and second information indicating which of multiple bandwidth parts, including the one or more bandwidth parts to be configured for the UE, is to be activated for the UE,
wherein the method further comprises:
generating the first information and the second information; and
receiving a first message, via the F1 interface, from the gNB-CU, the first message including the first information and the second information, and
wherein the first information is an information element comprising:
one or more bandwidth part indices respectively corresponding to the one or more bandwidth parts to be configured for the UE; and
frequency domain location information of each of the one or more bandwidth parts, the one or more bandwidth parts being constituted by a plurality of contiguous physical resource blocks.

2. The method according to claim 1, wherein generating the first information and the second information comprises generating the first information and the second information in response to an active bandwidth part of the UE being changed.

3. The method according to claim 1, wherein the one or more bandwidth parts to be configured for the UE include a first bandwidth part and a second bandwidth part, and the method further comprises:
transmitting Downlink Control Information (DCI) on a Physical Downlink Control Channel (PDCCH) to the UE for switching an active bandwidth part of the UE from the first bandwidth part to the second bandwidth part.

4. A gNB Distributed Unit (gNB-DU) configured to host a Physical (PHY) layer and a Medium Access Control (MAC) layer, the gNB-DU comprising:
an F1 interface configured to connect the gNB-DU to a gNB Central Unit (gNB-CU) hosting a Radio Resource Control (RRC) layer; and
a processor configured to send to the gNB-CU, via the F1 interface, a message including first information indicating one or more bandwidth parts to be configured for a User Equipment (UE) and second information indicating which of multiple bandwidth parts, including the one or more bandwidth parts to be configured for the UE, is to be activated for the UE,
wherein the processor is further configured to:
generate the first information and the second information;
receive a first message, via the F1 interface, from the gNB-CU, the first message including the first information and the second information, and
wherein the first information is an information element comprising:
one or more bandwidth part indices respectively corresponding to the one or more bandwidth parts to be configured for the UE; and frequency domain location information of each of the one or more bandwidth parts, the one or more bandwidth parts being constituted by a plurality of contiguous physical resource blocks.

5. The gNB-DU according to claim 4, wherein the processor is further configured to generate the first information and the second information in response to an active bandwidth part of the UE being changed.

6. The gNB-DU according to claim 4, wherein the one or more bandwidth parts to be configured for the UE include a first bandwidth part and a second bandwidth part, and
the processor is further configured to transmit Downlink Control Information (DCI) on a Physical Downlink Control Channel (PDCCH) to the UE for switching an active bandwidth part of the UE from the first bandwidth part to the second bandwidth part.

7. The method according to claim 1, wherein the first information and the second information are generated in response to receiving a second message from the gNB-CU.

8. The gNB-DU according to claim 4, wherein the processor is further configured to generate the first information and the second information in response to receiving a second message from the gNB-CU.

9. The method according to claim 1, wherein the message further includes, distinct from the first information and the second information, third information indicating a subcarrier spacing of a synchronization signal block (SSB).

10. The gNB-DU according to claim 4, wherein the message further includes, distinct from the first information and the second information, third information indicating a subcarrier spacing of a synchronization signal block (SSB).

* * * * *